United States Patent [19]
Milkovic

[11] 3,875,508
[45] Apr. 1, 1975

[54] METERING ELECTRICAL ENERGY (KWH) IN SINGLE PHASE SYSTEMS

[75] Inventor: Miran Milkovic, Schenectady, N.Y.

[73] Assignee: General Electric Company

[22] Filed: Sept. 7, 1973

[21] Appl. No.: 395,142

[52] U.S. Cl. .............................................. 324/142
[51] Int. Cl. ............................................. G01r 21/00
[58] Field of Search ...... 324/142; 235/194; 328/160

[56] References Cited
UNITED STATES PATENTS
| | | | |
|---|---|---|---|
| 3,710,254 | 1/1973 | Kusui | 324/142 |
| 3,746,851 | 7/1973 | Gilbert | 324/142 |

OTHER PUBLICATIONS
Dempster et al., Elec. Letters, Sept. 9, 1971, pp. 519–520.

Primary Examiner—Stanley T. Krawczewicz
Attorney, Agent, or Firm—Cushman, Darby & Cushman

[57] ABSTRACT

Metering kWh in a single-phase, two-wire, $f_L$ hertz, electrical system is accomplished by multiplying analog signals representing line current and voltage so as to produce a series of width-and-amplitude modulated pulse signals, each representing instantaneous power in the system during a sampling interval $T_S = 1f_S$; $T_L = 1/f_L$ being much greater than $T_S$. The series of modulated pulse signals is converted in, for example, a low-pass filter to a signal having an amplitude representative of average power. An analog-to-pulse rate converter is used for converting the signal representing average power to another series of output pulse signals having a variable signal repetition rate f proportional to average power, each output pulse signal representing a constant, or quantized, amount of electrical energy. A stepping switch and register performs conventional accumulation, storage and display functions in response to said series of output pulse signals delivered thereto.

10 Claims, 18 Drawing Figures

METERING ELECTRICAL ENERGY (KWH) IN SINGLE PHASE SYSTEMS

CROSS-REFERENCES TO RELATED PATENT APPLICATIONS

A related copending U.S. patent application, Ser. No. 361,030, filed May 17, 1973, in behalf of inventor-applicant M. Milkovic, titled ELECTRONIC METERING OF ACTIVE ELECTRICAL ENERGY (kWh) (RD-5417), discloses and claims a method and apparatus for metering kWh in polyphase systems. Another related copending U.S. continuation patent application, Ser. NO. 365,429, filed May 31, 1973 in behalf of inventor-applicant M. Milkovic, titled CURRENT TRANSFORMER WITH ACTIVE LOAD TERMINATION (RD-6625) discloses and claims a current-to-voltage converter which may be employed to advantage in the invention hereinafter disclosed. Another related copending U.S. patent application, Ser. No. 346,412, filed March 30, 1973 in behalf of inventor-applicant M. Milkovic, titled CURRENT TRANSFORMER WITH ACTIVE LOAD TERMINATION FOR PROVIDING, INTER ALIA, PHASE ANGLE ALTERATION (RD-5801) discloses and claims a phase-compensated current-to-voltage converter which may be employed to advantage in the invention hereinafter disclosed. The aforesaid M. Milkovic is the same inventor-applicant in whose behalf this patent application is filed.

The entire right, title and interest in and to the inventions described in the aforesaid patent applications, as well as in and to the aforementioned patent applications, and the entire right, title and interest in and to the invention hereinafter disclosed, as well as in and to the patent application of which this specification is a part, are assigned to the same assignee.

BACKGROUND OF THE INVENTION

The subject invention pertains, in general, to metering active electrical energy (e.g., kWh) in electrical systems; and, in particular, to a method and apparatus for metering electrical energy in single-phase electrical systems having two lines, or wires.

Electrical energy (kilowatt-hours, or kWh) has been, and continues to be, metered with the rotating disk type of meter which is disclosed in, among other sources, the "Electrical Metermen's Handbook," Chapter 7, seventh Edition, published 1965 by Edison Electric Institute. The invention hereinafter disclosed represents a departure from the methodology and apparatus exemplified by the rotating disk-type meter.

In addition, those who are familiar with the instrumentation and metering arts, respecting electrical power and energy, know of proposed systems including apparatus employing electronic and solid state devices for measuring power and energy. In such apparatus, the electronic and solid state devices replace the conventional rotating disk. For example, the following patents disclose systems including electronic and solid state devices for measuring electrical energy: Canadian Pat. No. 801,200; U.S. Pat. No. 3,602,843; and Swiss Pat. No. 472,677. The invention hereinafter disclosed represents a departure from the methodology and apparatus disclosed in the aforesaid patents.

SUMMARY OF THE INVENTION

The subject invention pertains, more particularly, to metering active electrical energy (e.g., kWh) in two-wire single-phase electrical systems by: converting analog signals representing measured line current and voltage to a series of output signals having a signal repetition rate proportional to average power, each output signal representing a constant, or quantized, amount of power; and, accumulating said output signals, the accumulation representing energy.

One object of the invention is the provision of a method and apparatus for metering kWh in a single-phase electrical system having two wires, or lines.

Another object of the invention is the provision of a meter for metering active electrical energy; said meter comprising solid state circuits which may be fabricated in the form of monolithic integrated structures.

Another object of the invention is the provision of a method and apparatus for metering active electrical energy; said method and apparatus employing analog-to-modulated pulse conversions as well as analog-to-pulse-rate conversions in computing active electrical energy.

In accordance with one example of the invention, electrical energy (kWh) in a single-phase, two-line, $f_L$ hertz, electrical system is metered by producing analog signals representative of measured line current and measured line voltage. Said analog signals are sampled at a high sampling rate $f_S$ (where $f_S$ is greater than $f_L$) and converted to a series of width-and-amplitude modulated signals, said series having a signal repetition rate $f_S$ and each modulated signal representing instantaneous power, during an interval $1/f_S$, in the system. The series of modulated signals is converted to another signal representing average power which is, in turn, converted to a series of quantized signals having a signal repetition rate $f$ proportional to the average power, each quantized signal representing a constant amount of electrical energy (kWh). The quantized signals are counted, or accumulated, to provide information respecting total system energy.

Although the invention is hereinafter disclosed as being applicable for metering kWh in a single-phase, 60 hertz, electrical system having two lines, or wires, it is to be understood that such disclosure is made for the purpose of giving examples of the method and metering apparatus provided by the invention. The invention may be employed, as well, for metering active electrical energy in single phase electrical systems having: electrical loads which may include reactive impedance elements; and, system frequencies $f_L$ which may be 60 hertz as well as less than, or more than; 60 hertz. Furthermore, in accordance with the invention, kWh metering may be performed as a real-time operation, or it may be performed as an off-line operation. In addition, in accordance with the invention, totalization of instantaneous power from various single phase systems and subsequent metering of total energy may be performed.

Other objects, as well as various features of the invention, appear hereinafter wherein a method of, as well as apparatus for, metering active electrical energy is disclosed for the purpose of illustrating the invention; said disclosure including the accompanying drawing figures, the content of which is hereinafter described.

DRAWINGS

Figure 10:
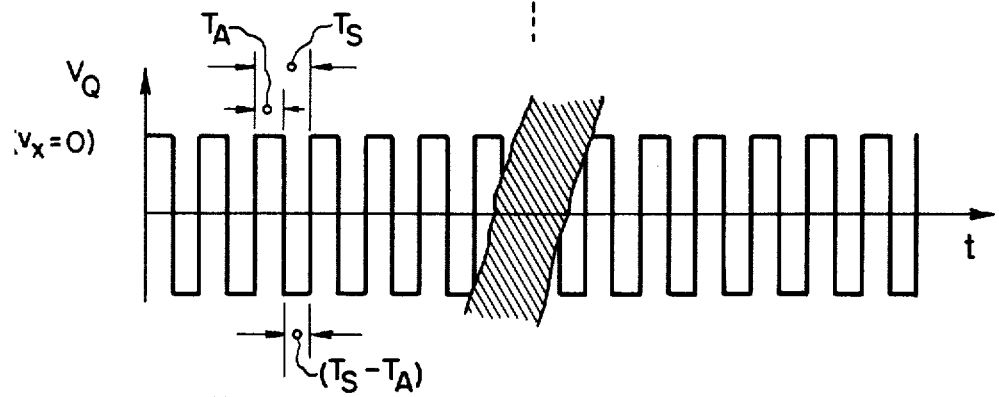

FIG. 10, is an oscillogram showing a series of unmodulated bipolar, voltage pulses $V_Q$ having a pulse repetition rate, or frequency, $f_S$; each unmodulated bipolar voltage pulse having positive and negative voltage amplitudes as well as equal positive and negative durations $T_A$ and ($T_S - T_A$) so that each bipolar voltage pulse is symmetrical in amplitude and duration respecting the positive and negative portions of said pulse.

Figure 9:
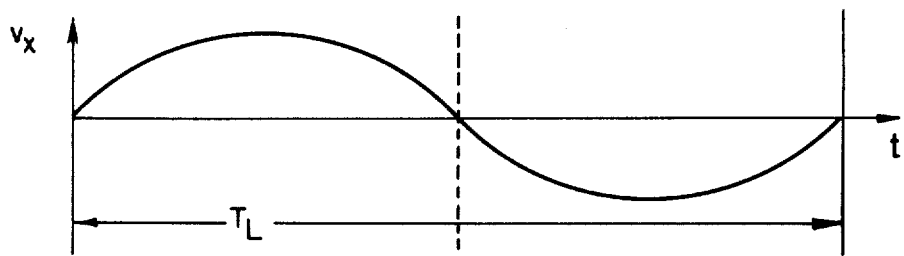
FIG. 9 is an oscillogram showing one cycle ($T_L = 1/f_L$) of an analog voltage signal $v_x$ representing the line voltage $v$ (FIG. 2) and being used as an input signal to a multiplier unit 24 of the electrical energy meter shown in FIG. 8.
Figure 11:
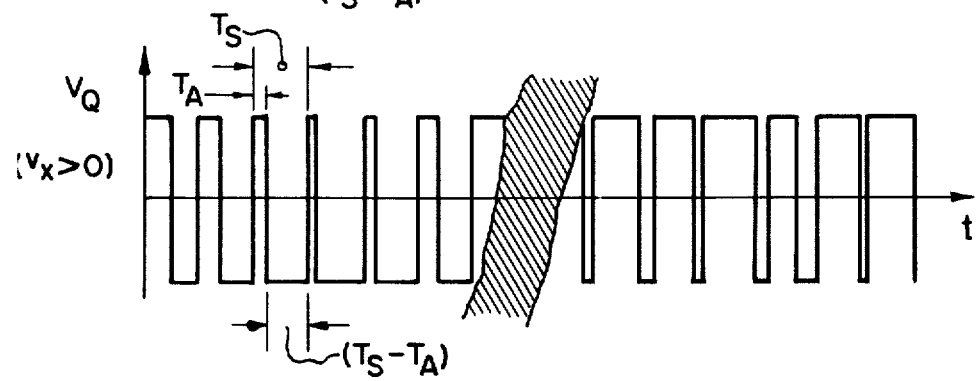

FIG. 11 is another oscillogram showing a series of pulse-width modulated bipolar voltage pulses $V_Q$ having the pulse repetition rate, or frequency, $f_S$; i.e., each bipolar voltage pulse $V_Q$ (FIG. 10) being, in effect, pulse-width modulated with the amplitude information of $v_x$ (FIG. 9).

Figure 8:
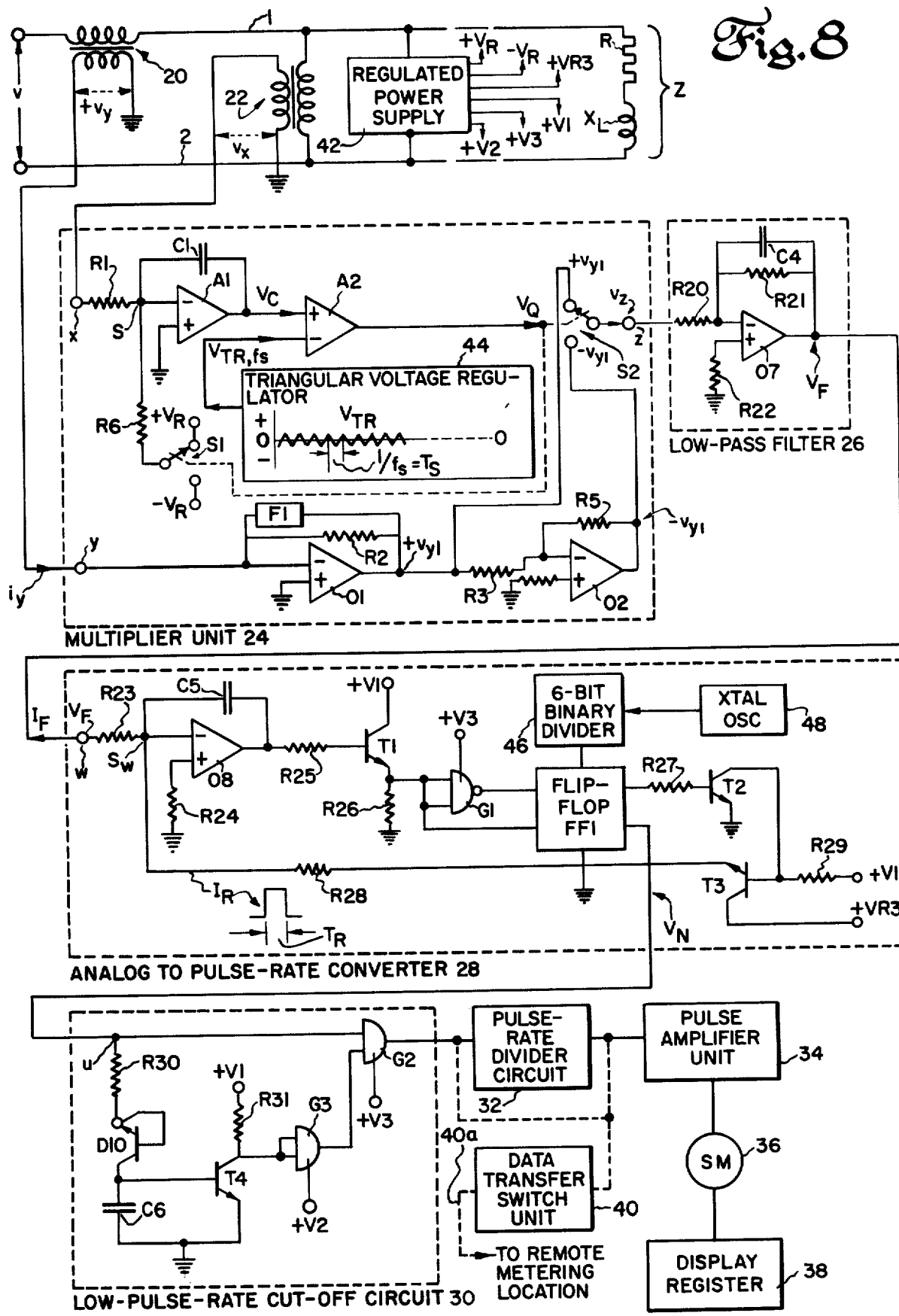
FIG. 8 is an electrical diagram of a single-phase electrical energy meter in accordance with one illustrative embodiment of the invention.
Figure 12:
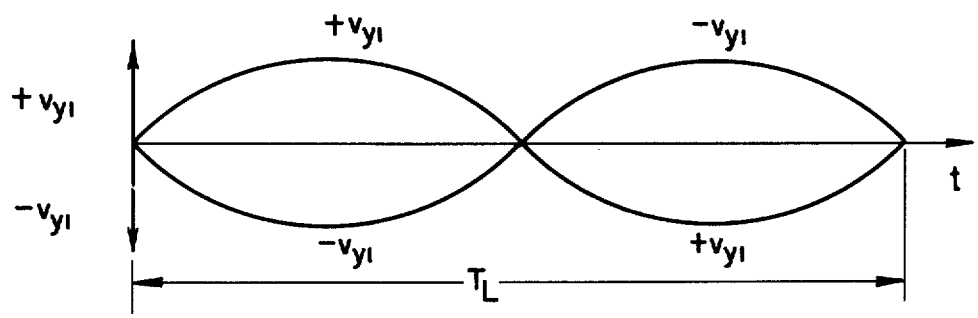

FIG. 12 is an oscillogram showing one cycle ($T_L = 1/f_L$) of an analog voltage signal $+v_y$ representing the line current $i$ (FIG. 3) as well as one cycle of another analog voltage signal $-v_y$ representing the line current $i$ (FIG. 3) as being inverted 180°; the analog voltage signals $+v_y$ and $-v_y$ being input signals delivered to the multiplier unit 24 shown in FIG. 8.

Figure 1:
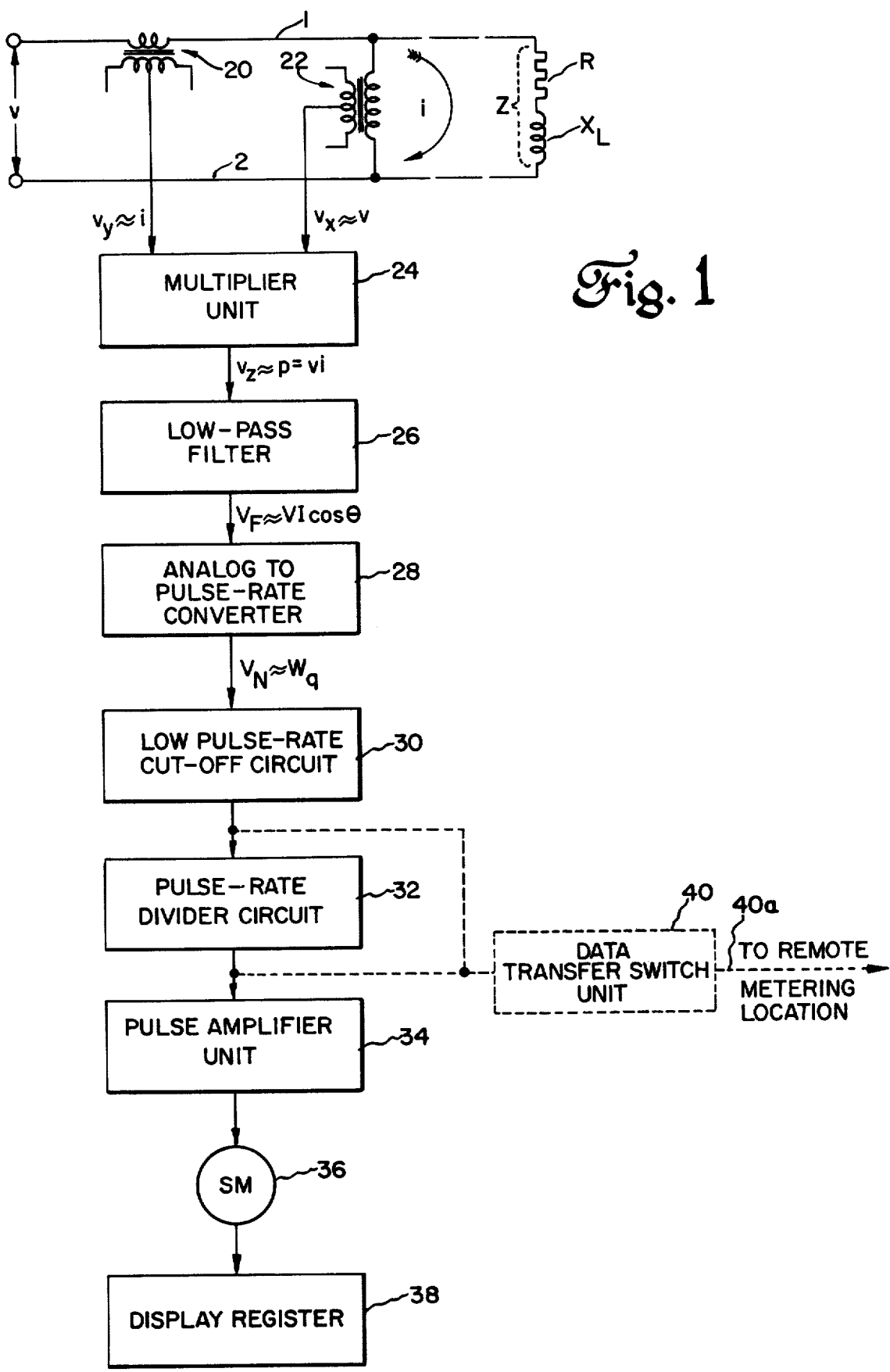
FIG. 1 is a block diagram and schematic illustration showing various components comprising apparatus for metering kWh, in accordance with the invention, connected with a single-phase, two-line, $f_L$ hertz, electrical system.
Figure 13:
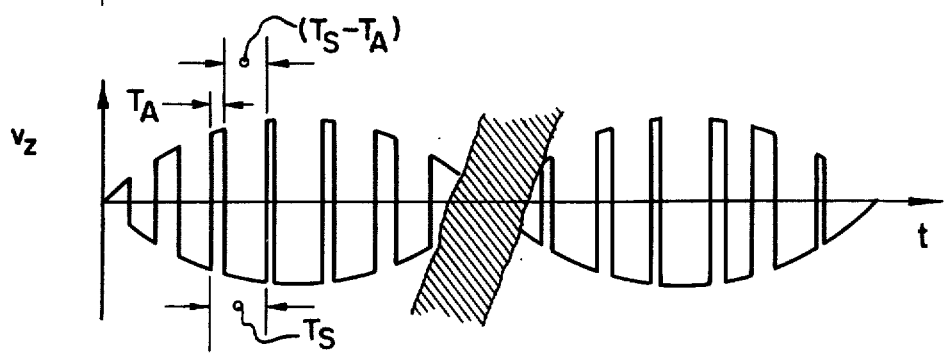

FIG. 13 is an oscillogram showing a series of bipolar voltage pulse signals $V_Z$ which have been both width and amplitude modulated, each said bipolar pulse signal $v_z$ representing instantaneous electrical power delivered to the electrical load Z shown in FIGS. 1 and 8; each bipolar voltage pulse signal $v_z$ (FIG. 13) being, in effect, a pulse-width modulated bipolar voltage pulse $v_Q$ (FIG. 11) which has also been amplitude modulated with the amplitude information of $+v_y$ and $-v_y$ (FIG. 12).

Figure 5:
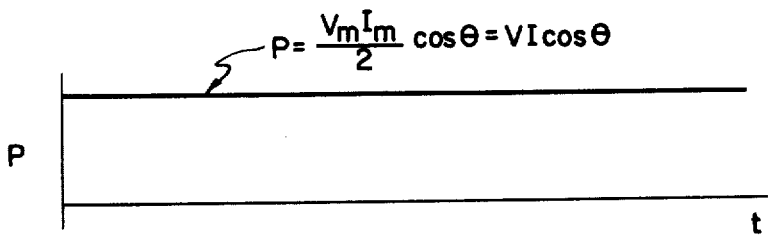
FIG. 5 is an oscillogram representing the average power P, as a function of time, delivered to the electrical load of FIG. 1.
Figure 14:
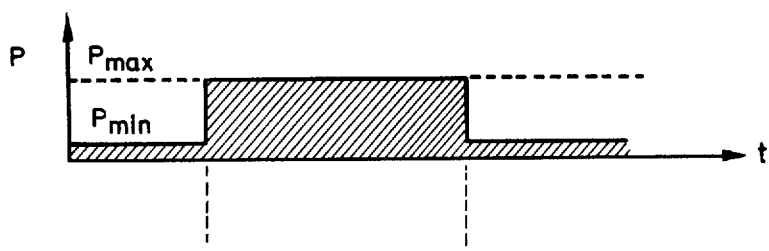

FIG. 14 is a graphical representation, similar to the one shown in FIG. 5, showing average power P delivered to the electrical load Z of FIG. 1 over a period of time; the delivered average power P reaching maximum (P max.) and minimum (P min.) power levels during the time period.

Figure 15:
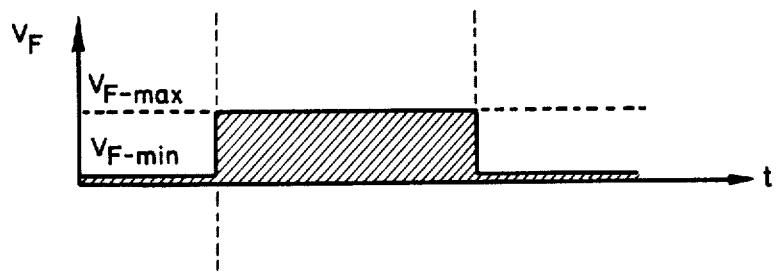

FIG. 15 is another graphical representation showing the variation of an analog voltage signal $V_F$ delivered at the output of the low pass filter shown in FIGS. 1 and 8; the analog voltage signal $V_F$ being a d.c., or unipolar, signal corresponding to, and representing, the average power P variation shown at FIG. 14.

Figure 16:
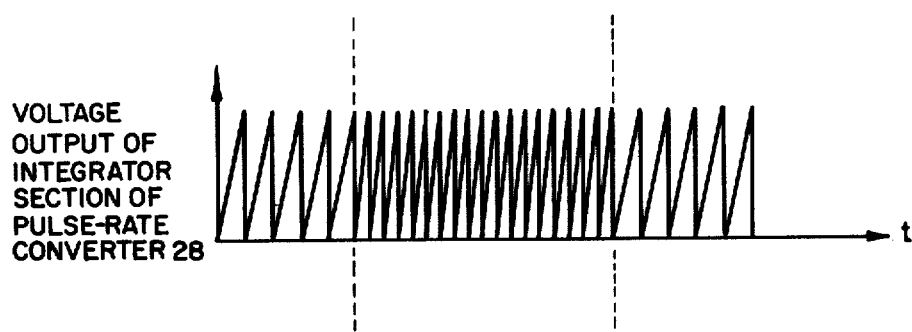

FIG. 16 is another graphical representation showing sawtooth voltages produced by an integrator unit of an analog-to-pulse rate converter 28 (FIGS. 1 and 8) employed in the metering apparatus of the subject invention; the sawtooth voltages having a repetition rate, or frequency, proportional to the analog voltage signal $V_F$ (FIG. 15) as well as the average power P (FIG. 14).

Figure 17:
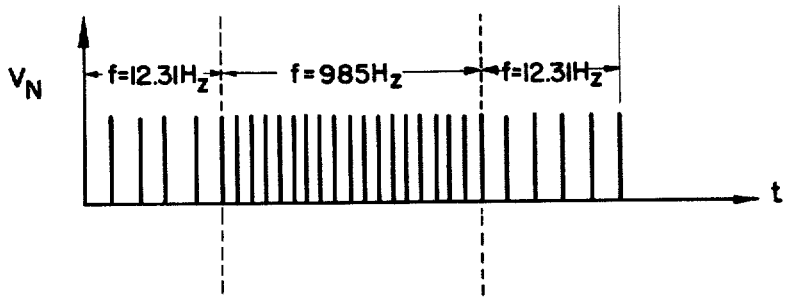

FIG. 17 is another graphical representation showing a series of output voltage pulse signals $V_X$ delivered at the output of the aforementioned analog-to-pulse rate converter 28 (FIGS. 1 and 8) wherein each pulse signal $V_X$ represents a constant, or quantized, amount of electrical energy $W_q$, said series of pulse signals having a variable pulse repetition rate, or frequency, which is proportional to the average power P (FIG. 14) as well as to the analog voltage signal $V_F$ (FIG. 15).

Figure 18:
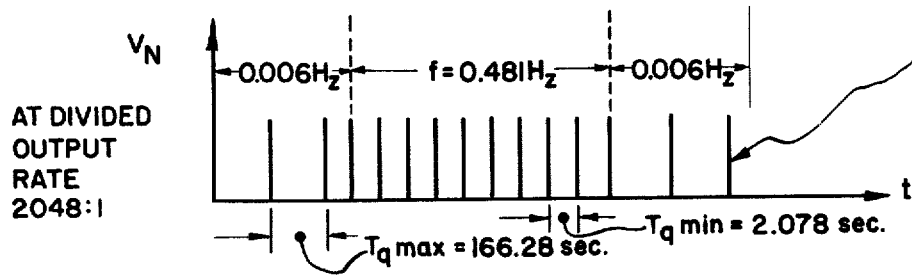

FIG. 18 is another graphical representation showing another series of output voltage pulse signals delivered at the output of a binary divider unit 32 (FIGS. 1 and 8) which receives the series of quantized voltage pulse signals from the analog-to-pulse rate converter 28 (FIGS. 1 and 8) and converts the signal repetition rate, or frequency, of said series of quantized pulse signals to a lower repetition rate, or frequency.

DETAILED DESCRIPTION

Figure 2:
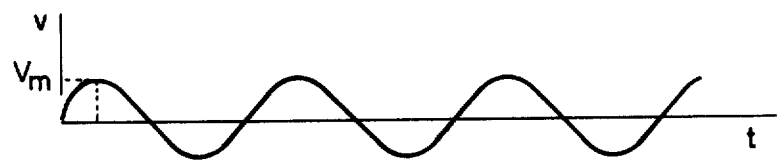
FIG. 2 is an oscillogram representing the instantaneous time variation of a sinusoidal line voltage $v$ between the lines 1 and 2 of the single phase system shown in FIG. 1.

At FIG. 1 an electrical load Z is connected between two lines, 1 and 2, of a single-phase, $f_L$ hertz, electrical system. In the embodiment illustrated at FIG. 1, $f_L$ may be 60 hertz. The electrical load Z is represented in FIG. 1 by a resistance element R and an inductive reactance element $X_L$, both connected in series and connected between lines 1 and 2. Between the lines 1 and 2 there exists a voltage $v$, the source of which may be a single-phase distribution transformer. The voltage $v$ is an instantaneous alternating voltage having a voltage amplitude which varies sinusoidally with respect to time as shown at FIG. 2. Expressed mathematically:

$$v = V_m \sin 2\pi f_L t \qquad (1)$$

where $v$ is the instantaneous voltage between lines 1 and 2; $V_m$ is the peak, or maximum voltage, as indicated at FIG. 2; $f_L$ is the line frequency (e.g., 60 hertz) and t represents time.

Figure 3:
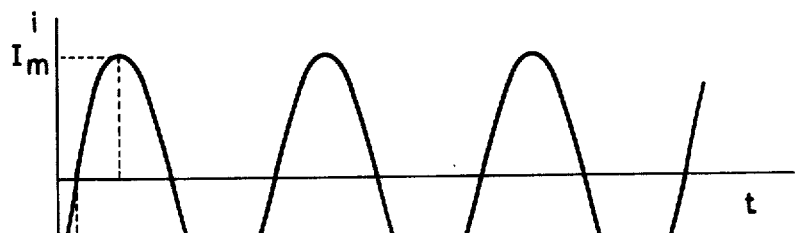
FIG. 3 is another oscillogram representing the instantaneous time variation of a phase-displaced sinusoidal line current $i$ in the lines 1 and 2 of the single phase system shown in FIG. 1.

An instantaneous line current $i$, which varies sinusoidally as shown at FIG. 3, circulates through the lines 1 and 2 and the load Z connected therebetween. From well known a.c. electrical circuit theory:

$$i = V_m/Z \sin 2\pi f_L t \qquad (2)$$

And it follows that:

$$i = I_m \sin (2\pi f_L t - \theta) \qquad (3)$$

where $i$ is the instantaneous current in the load Z and in lines 1 and 2; $I_m$ is the peak, or maximum, current, as indicated in FIG. 3; and $\theta$ is the phase angle (or power factor angle) between phasors $V_m$ and $I_m$.

In FIG. 1 a current transformer 20 and a potential transformer 22 are coupled with the lines 1 and 2 as shown. The secondary winding of current transformer $$P = \frac{1}{T} \int_0^T V_m \sin\omega t \; I_m \sin(\omega t - \theta) \, dt \quad \text{(equation 11)}$$

$$P = \frac{V_m I_m}{2} \cos\theta \quad \text{(equation 11a)}$$

$$P = VI \cos\theta \quad (12)$$

where P is the average power.

20 produces an analog voltage signal $+v_y$, representative of the line current $i$ (FIG. 3). Also, the secondary winding of the potential transformer 22 produces another analog voltage signal $v_x$ (FIG. 9) representative of the voltage $v$ (FIG. 2) between the lines 1 and 2.

As indicated at FIG. 1 the secondary windings of the current transformer 20 and potential transformer 22, which develop the analog voltage signals $+v_y$ and $v_x$, are coupled to input terminals of a multiplier unit 24. As described in more detail hereinafter, the analog voltage signals $v_x$ and $+v_y$, representing $v$ and $i$, respectively, are processed in multiplier unit 24 so as to provide an output voltage signal representative of the mathematical product $vi$.

In effect, the multiplier unit 24 performs the following multiplication:

$$p = vi$$

The mathematical multiplication represented by equation 4 is accomplished by employing the analog voltage signals $v_x$ and $+v_{yt}$ and processing these signals and another signal $-v_{yt}$ in the way hereinafter described with reference to FIG. 8. In equation 4, $p$ represents instantaneous power in the single-phase electrical system illustrated at FIGS. 1 and 8.

By substituting the expressions for $v$ and $i$, hereinbefore set forth in equations 1 and 3, in equation 4, the instantaneous power p may be expressed as follows:

$$p = [V_m \sin\omega t][I_m \sin(\omega t - \theta)] \quad (5)$$

where $$\omega = 2\pi f_L \quad (6)$$

and, where the various letter symbols $p$, $V_m$, $I_m$, $\theta$ and $t$ have been defined hereinbefore. Equation 5, when expanded, appears as:

$$p = V_m I_m \sin\omega t \sin(\omega t - \theta) \quad (5a)$$

It is known that:

$$\sin\omega t \sin(\omega t - \theta) = \tfrac{1}{2}\cos\theta - \cos(2\omega t - \theta) \quad (5b)$$

When equation 5b is substituted in equation 5a:

$$p = \frac{V_m I_m}{2} \cos\theta - \frac{V_m I_m}{2} \cos(2\omega t - \theta) \quad \text{(equation 7)}$$

The relationship between peak and rms amplitudes are as follows:

$$V_m = \sqrt{2V} \quad (8)$$
$$I_m = \sqrt{2I} \quad (9)$$

and $V$ represents the *rms*, or effective, amplitude of $v$ and $I$ represents the *rms*, or effective, amplitude of $i$.

When equations 8 and 9 are substituted in equation 7, $$p = VI \cos\theta - VI \cos(2\omega t - \theta) \quad (10)$$

Figure 4:
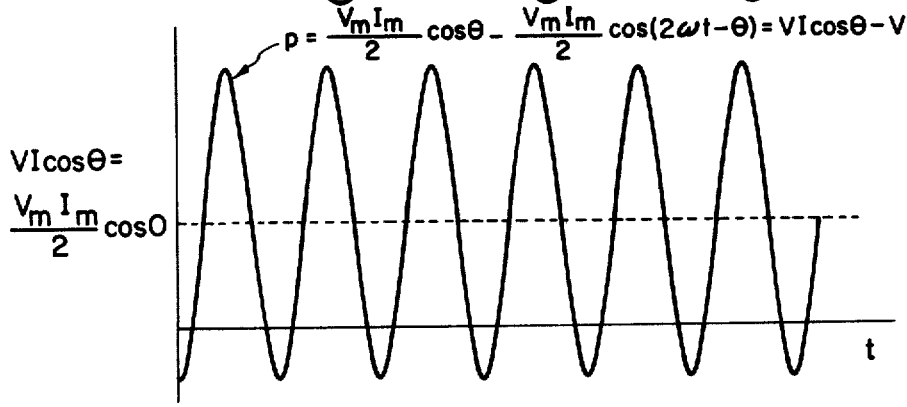
FIG. 4 is another oscillogram representing the instantaneous time variation of instantaneous power $p$, both real and reactive, delivered to an electrical load Z connected between the lines 1 and 2 of the single phase system shown in FIG. 1.

In equation 10 the first term ($VI \cos\theta$) represents, as indicated at FIGS. 4 and 5, a steady state, unipolar or d.c., term and is the average power P in the system comprising lines 1 and 2 and the load Z.

It can also be demonstrated that:

As is described in detail hereinafter the second term $VI \cos(2\omega t - \theta)$ of equation 10 is, in effect, eliminated by using a low-pass filter 26, coupled to the output of the multiplier unit 24. As a consequence, a voltage signal ($V_F$) representative of $P = VI \cos\theta$, the average power, is delivered to an analog to pulse-rate converter 28.

Equations 7, 10, 11a and 12 for instantaneous power $p$ and average power $P$ are graphically represented in FIG. 4. The average power $P$, as defined by equations 11a and 12, is also graphically represented in FIG. 5.

The multiplier unit 24 shown at FIG. 1 may be a four-quadrant time-division multiplier network which processes the analog voltages $v_x$ and $+v_y$, representing $v$ and $i$, to produce an output signal which is a series of width-and-amplitude modulated bipolar voltage pulse signals as indicated at FIG. 13, said series having a constant signal repetition rate, or frequency, $f_N$; each bipolar voltage pulse signal being designated as the voltage pulse $v_z$. Thus, each modulated bipolar voltage pulse $v_z$ represents the instantaneous mathematical product $p = vi$ (according to equation 4) at a given instant of time $t$. Also, in accordance with the analysis hereinbefore set forth, each voltage pulse $v_z$ represents $p$ as defined by equation 7, or equation 10.

As shown in simplified form at FIG. 1 the voltage pulses $v_z$ delivered at the output of multiplier unit 24 are delivered to an input of a low-pass filter 26. The low-pass filter 26, in effect, eliminates the second term of equation 10. Thus, a steady-state, unipolar or d.c., voltage signal $V_F$ is delivered at the output of low-pass filter 26 and voltage signal $V_F$ is representative of the average power P as defined in equation 12 and graphically illustrated in FIGS. 4 and 5. The steady-state, unipolar or d.c., voltage signal $V_F$ from the low-pass filter 26 is delivered to the input of an analog-to-pulse-rate converter 28.

The voltage signal $V_F$ is representative of the average power P which is defined in equations 11a and 12 and graphically shown at FIG. 5. In effect, the analog-to-pulse rate converter 28 functions to perform an integration, or summation, over a period of time T of the voltage signal $V_F$, representative of average power P, and subsequently provide an output signal $V_N$, or signals, representative of electrical energy W in the system.

Stated mathematically, $$W = \int_0^T P \, dt \quad \text{(equation 13)}$$

However, if the time duration $T = T_q$ (i.e., the indicated integration occurring in the analog-to-pulse rate converter 28 for a finite time interval $T_q$) then in each time interval $T_q$ the energy W accumulates to the predetermined quantity $W_q$ in the integrator section of the converter 28. Thus, the predetermined quantity of electrical energy $W_q$ accumulates in accordance with the relationship:

$$W_q = \int_0^{T_q} P \, dt \quad \text{(equation 13a)}$$

Figure 6:
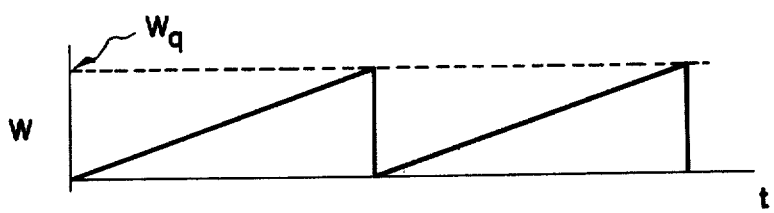
FIG. 6 is an oscillogram showing a sawtooth waveform representing electrical energy W resulting from the integration of average power P over a finite time interval.
Figure 7:
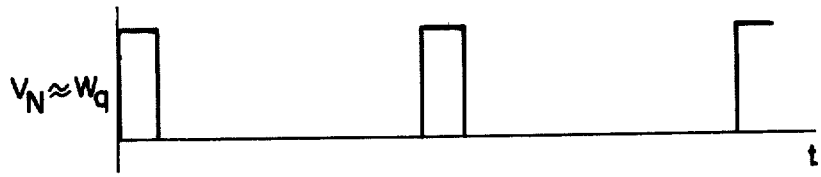
FIG. 7 is another oscillogram showing a series of output pulse signals having a variable signal repetition rate $f$, each output pulse representing a quantized, or constant, amount of electrical energy $W_q$.

FIGS. 5, 6 and 7 provide a convenient graphical illustration of the performance of the analog-to-pulse rate converter 28. The average power P (FIG. 5) represented by the voltage signal $V_F$ is integrated over a predetermined time interval $T_q$ thereby providing a signal representative of the electrical energy W (FIG. 6) and each time that W reaches a predetermined, or quantized, amount, or level, of electrical energy $W_q$ (FIG. 6) a voltage pulse signal $V_N$ (FIG. 7) is delivered at the output of the analog-to-pulse rate converter 28. For example, in the embodiment illustrated in the drawing figures each output voltage pulse $V_N$ is representative of the quantized electrical energy $W_q = 1.2$ watt-hours (Wh). Accordingly, the analog-to-pulse rate converter 28 delivers at its output a series, or train, of pulses $V_N$; the accumulated number of output pulses $V_N$ representing the total electrical energy W of the system. The aforesaid series of pulses $V_N$ has a variable pulse repetition rate $f$ which is proportional to the average system power P. If, in equation 13a, the average power P is constant, as in the situation shown graphically at FIG. 5, then equation 13a may be written as:

$$W_q = p \, T_q = \text{a constant} \quad (13b)$$

where $W_q$ represents the constant, or quantized, energy of each of the output signal pulses $V_N$. In equation 13b $W_q$ is also designated as the watt-hour constant. That is, $W_q$ is constant and independent of the product of P and $T_q$. Moreover, $T_q$ is inversely proportional to P due to the mode of operation of the analog-to-pulse rate converter 28. Also the output pulse rate, or pulse repetition rate, $f$ may be stated as:

$$f = 1/T_q = P/W_q = \text{p/watt-hour constant} \quad \text{(equation 14)}$$

Hence, the frequency $f$, or output pulse repetition rate, of the analog-to-pulse rate converter 28 is proportional to the average power P delivered to the load Z. From equation 14 the time interval $T_q$, between output voltage pulses $V_N$ representing quantized levels of electrical energy $W_q$, may be stated as:

$$T_q = 3600 \, W_q/P \quad (15)$$

where the time interval $T_q$ is in seconds, the quantized electrical energy $W_q$ (or, watt-hour constant) is in watt-hours and the average power P is in watts. The time interval $T_q$ in equation 13b may also be expressed as:

$$T_q = K_C/V_F \quad (16)$$

wherein $K_C$ is a conversion factor whose units are volt-seconds and $V_F$ is the aforementioned analog voltage signal delivered by the low-pass filter 26 to the analog-to-pulse rate converter 28. Also, $V_F$ may be expressed as:

$$V_F = K_M P \quad (17)$$

wherein $K_M$ is a multiplication factor in amp$^{-1}$ and P is the power in watts in the load Z. By combining the equations 13b, 16 and 17 the watt-hour constant $W_q$ may be stated as:

$$W_q = K_C/K_M \quad (18)$$

Thus, the watt-hour constant $W_q$ is a quantity determined solely by circuit and system parameters. Therefore, the electrical energy meter provided by the invention is one wherein $K_C$ and $K_M$ depend only on the values of resistance elements, reference voltages, and transistor $V_{BE}$ ratios, rather than on absolute voltage values.

Referring again to FIG. 1, the series of output voltage pulse signals $V_N$, occurring at a variable pulse repetition rate $f$, at the output of the analog-to-pulse rate converter 28 are delivered to a low pulse-rate cut-off circuit 30. As described hereinafter in more detail the cut-off circuit 30 prevents the passage of pulses $V_N$ which occur at the output of the converter 28 at or below a preselected minimum pulse repetition rate $f_{min}$. At $f_{min}$ the average power is designated $P_{min}$ and the time interval $T_q$ between pulses $V_N$ is $T_{q \, max}$. Thus, the cut-off circuit 30 functions to allow the single-phase kilowatt hour meter of the invention to meter quantized pulses above a preselected pulse repetition rate $f_{min}$. Since $f_{min}$ may be preset to a relatively low value spurious noise signals may be rejected and metering accuracy enhanced.

A series of output voltage pulses $V_N$ are passed through the low pulse-rate cut-off circuit 30 if the pulse repetition rate of the series is above preselected frequency $f_{min}$ and the pulses $V_N$ so passed are delivered to the input of a pulse-rate divider circuit 32. As is described in more detail hereinafter, the divider circuit 32 substantially reduces the pulse repetition rates f and, as a consequence, enables a stepping motor 36 and display register 38 to operate with time interval $T_q$ having duration compatible with the speed and response of stepping motor 36 and display register 38. Moreover, the pulse-rate divider circuit 32 may be a non-volatile type of divider unit so as to provide buffer storage capability in the event of a power failure so that information pulses being processed in the divider circuit 32 may be safely stored therein during the period of the power failure and, subsequently, processed after power has been restored.

Voltage pulses $V_N$ at the divided, or reduced, pulse repetition rate are delivered from the output of the divider circuit 32 to an input of a pulse amplifier unit 34 so that said pulses may be suitably amplified prior to delivery to a stepping motor 36. The stepping motor 36 drives an electromechanical display register 38. Display register 38 displays (in, for example, decimal digits) the accumulated electrical energy in kilowatt-hours, or kW-hours. While a conventional stepping motor 36 and electromechanical display register 38 are illustrated in FIG. 1, it is to be understood that the stepping motor 36 and display register 38 are illustrated by way of example only. The electrical energy meter according to the invention may employ, instead of the aforesaid stepping motor 36 and electromechanical display register 38, a liquid crystal or LED display suitably coupled with a non-volatile electronic memory unit driven by suitable logic circuitry.

Also shown in FIG. 1 is a data transfer switch unit 40. The transfer switch unit 40 is illustrated in FIG. 1 as being coupled between the output of the pulse-rate divider circuit 32, or output of the cut-off circuit 30, and a remote metering location. Dotted lines are employed to illustrate the switch unit 40 as well as associated connections to the divider circuit 32, cut-off circuit 30 and the remote metering location because the employment of the data transfer switch unit 40 in conjunction with the kilowatt-hour meter of the invention is optional. The use of the data transfer switch unit 40, in the way suggested at FIG. 1, is advantageous in that the series of output voltage pulses may be routed through the data transfer switch unit 40 to the remote metering location for processing at the same time a like series of voltage pulses is being routed through the pulse amplifier unit 34, stepping motor 36 and display register 38. Of course, the two different pulse paths (i.e., to the display register 18 and/or to the remote metering location) may be alternative paths rather than simultaneously parallel paths. Operationally, the data transfer switch unit 40 may be activated by an activating signal, or signals, from the remote metering location. When activated, voltage pulses from the output of the divider circuit 32, or cut-off circuit 30, are routed through the data transfer switch unit 40 to the remote metering location where, for example, the voltage pulses may be converted to magnetic signals and stored on a magnetic tape unit for subsequent processing.

At FIG. 8 a kWh meter in accordance with the invention is shown in greater detail. FIG. 8 is partly in schematic form and parly in block diagram form. As shown in FIG. 8, an electrical load Z is connected between the lines, or wires, 1 and 2. The electrical load Z is more accurately represented by an equivalent resistance element R and an equivalent inductive reactive element $X_L$ connected in series as indicated. It is to be understood that the method and apparatus provided by the invention is equally useful for metering electrical energy in a system having an electrical load Z which includes an equivalent capacitive reactance element rather than the inductive reactance element X shown in FIG. 8. A sinusoidally varying potential difference, or voltage, $v$ (FIG. 2) exists between the lines 1 and 2. For example, the source of the voltage $v$ may be the secondary winding of a distribution transformer (not shown). The instantaneous voltage v varies with time $t$ and has a frequency $f_L$; e.g., 60 Hz. A regulated power supply 42 is connected between the lines 1 and 2 as shown. Power supply 42 provides the regulated output voltages, hereinafter described and identified, for operation of the various components of the electrical energy meter of the invention. Connected in series in line 1 is the primary winding of a current transformer 20. The secondary winding of the current transformer 20 develops an analog voltage signal $+v_y$ representative of current $i$ in the primary winding of current transformer 20 and in line 1. Also connected between the lines 1 and 2 is the primary winding of a potential transformer 22. The secondary winding of the potential transformer 22 develops an analog voltage signal $v_x$ representative of the voltage $v$ across the primary winding of the potential transformer 22; i.e., the voltage between the lines 1 and 2. The line current $i$ in the series circuit comprising line 1, resistance element R, inductive reactance element $X_L$ and line 2 is a sinusodially varying current which, as illustrated at FIG. 3, lags the line voltage $v$ by $\theta$ electrical degrees due to the inclusion of the inductive reactance element $X_L$ in the load 41 Z.

As indicated at FIG. 8, the analog voltage signals $v_x$ and $+v_y$ (representing $v$ and $i$, respectively) are delivered to separate input terminals $x$ and $y$, respectively, of a multiplier unit 24. The multiplier unit 24 employed herein is a four-quadrant time-division multiplier; e.g., a pulse-width and pulse-amplitude modulation type multiplier, or PWA type multiplier. Such multipliers are known. See, for example, the article "A Transistorized Four-Quadrant Time-Division Multiplier with Accuracy of 0.1 Per Cent" by Hermann Schmid, IRE Transactions on Electronic Computers, Mar. 1958. See, also, the article "A High-Accuracy Time-Division Multiplier" by Edwin A Goldberg, RCA Review, Sept. 1952. The analog voltage signals $v_x$ and $+v_y$ which represent $v$ and $i$, respectively, have sinusoidal waveforms and vary, or oscillate, at the line frequency $f_L = 1/T_L$. The period of oscillation is $T_L$. The analog voltage signals $v_x$ and $+v_y$ are delivered simultaneously at the input terminals $x$ and $y$, respectively, of multiplier unit 24. The analog voltage signal $+v_y$ developed across the secondary winding of current transformer 20, as indicated at FIG. 8, causes a sinusoidal current $i_y$ to flow in the secondary winding of current transformer 20. The secondary current $i_y$ also varies, or oscillates, at the line frequency $f_L$. The secondary current $i_y$ is also an analog of the line current $i$; i.e., the current in the primary winding of the current transformer 20. From the input terminal y of multiplier unit 24 the current $i_y$ is fed to an inverting (−) input terminal of an operational amplifier 01. As indicated, the operational amplifier 01 is provided with a feedback resistor R2 and a phase correction network F1 which are connected in parallel with each other and between the inverting input (−) terminal and output terminal of operational amplifier 01. The operational amplifier 01 and the associated feedback resistor R2 and phase correction network F1 function as a current-to-voltage converter for converting the analog current signal $i_y$ to an analog voltage signal $+v_{yt}$. The analog voltage signal $+v_{yt}$ delivered at the output terminal of operational amplifier 01 is delivered via an input resistor R3 to an inverting input terminal (−) of another operational amplifier 02 which has a feedback resistor R5 connected between the aforesaid inverting input terminal and an output terminal of amplifier 02. At the output terminal of operational amplifier 02 the analog output voltage signal $-v_{yt}$ appears and this analog voltage signal is 180° out of phase (i.e., inverted) with respect to the analog voltage signal $+v_{yt}$. See FIG. 12.

As shown at FIG. 8, in multiplier unit 24 the analog voltage signals $+v_{yt}$ and $-v_{yt}$ are delivered from the output terminals of the operation amplifiers 01 and 02, respectively, to an analog switch S2, the operation of which is described hereinafter. The current-to-voltage converter comprising operational amplifier 01, resistor R2, compensation network F1, operational amplifier 02 and resistors R3 and R5 are disclosed in greater detail in the patent applications Ser. No. 365,429 (RD-6625) and Ser. No. 346,412 (RD-5801) hereinbefore more completely identified.

The analog voltage signal $v_x$ (FIG. 9) which has the line frequency $f_L = 1/T_L$ is delivered at the input terminal $x$ of multiplier unit 24 and via a resistor R1 to a summing point S, or node, which is directly connected to an inverting input terminal (−) of an operational amplifier A1. A capacitor C1 is connected between the summing point S and an output terminal of the operational amplifier A1, as shown in FIG. 8. The summing point S at the inverting input terminal of operational amplifier A1 is connected to one end of the resistor R1 and one end of another resistor R6. The values R1 and R6 are equal (i.e., R1 = R6). The other end of the resistor R6 is connected, as shown in FIG. 8, to another analog switch S1. The analog switch S1 is operable, as described hereinafter, to connect either of two reference voltages $+V_R$ or $-V_R$ to the resistor R6. The reference voltages $+V_R$ and $-V_R$ are steady-state, or d.c., voltages derived from the regulated power supply 42. The output terminal of operational amplifier A1 is connected to a non-inverting input terminal (+) of another operational amplifier A2 which functions as a comparator in the subject multiplier unit 24. A high frequency ($f_S$) triangular voltage generator 44, or source, is connected to the inverting input terminal (−) of the operational amplifier A2. The triangular voltage generator 44 delivers a voltage signal designated as voltage $V_{TR}$ at a frequency $f_S$ hertz and $f_S$ is greater than $f_L$: e.g., $f_S$ = 10,000 hertz and $f_L$ = 60 hertz. The frequency $f_S$ is, in effect, a sampling frequency. As indicated within the block 44 in FIG. 8, the triangular voltage $V_{TR}$ is a bipolar voltage comprising a series of triangular voltage signals having a signal repetition rate, or frequency, $f_S$; each triangular voltage signal having a period $T_s = 1/f_s$.

Operationally, the multiplier unit 24 may be described as a pulse-width converter employing feedback-type up-down integration. Let it be assumed, initially, that the input analog voltage signal $v_x$ at the terminal $x$ of multiplier unit 24 is zero (i.e., $v_x = 0$) and the series of bipolar triangular voltage signals $V_{TR}$, having the signal repetition rate $f_S$, or sampling frequency, is fed to the inverting (−) input terminal of comparator A2 and, furthermore, the reference voltage $+V_R$ is connected to the analog switch S1 to the transistor R6 so that an input current having the magnitude $V_R/R6$ is fed to the summing point S. With $v_x = 0$ there appears at the output terminal of operational amplifier A2, or comparator, a series of bipolar voltage pulse signals $V_Q$. The voltage pulses $V_Q$ have the waveforms shown in FIG. 10. As indicated, the voltage pulses $V_Q$ occur at the constant pulse repetition rate $f_S$, or sampling frequency. As shown at FIG. 10 the period of each voltage pulse $V_Q$ is $T_s = 1/f_s$. Since, as shown at FIG. 10, $v_x = 0$ each bipolar voltage pulse $V_Q$ in the series is symmetrical, i.e., the positive and negative pulse amplitudes of each voltage pulse $V_Q$ are equal and the positive $T_A$ and negative $(T_s - T_A)$ pulse durations are equal. In other words, at $v_x = 0$ $T_A = (T_s - T_A) = T_s/2$ for the voltage pulses $V_Q$, as shown at FIG. 10. More particularly, the positive and negative portions of each voltage pulse $V_Q$ in the series operate the analog switches S1 and S2. That is, at $v_x = 0$, the positive portion of each voltage pulse signal $V_Q$ in the series causes the analog switch S1, for the time duration $T_A$, to connect the reference voltage $+V_R$ with the resistor R6 so that the current $V_R R6$ passes through resistor R6 to summing point S and charges capacitor C1. Simultaneously, the aforesaid positive portion of each voltage pulse $V_Q$ in the series causes analog switch S2, for the time duration $T_A$, to connect the analog voltage $+v_{y1}$ at the output of operational amplifier 01, with the output terminal z of the multiplier unit 24. Similarly, at $v_x = 0$, the negative portion of each voltage pulse signal $V_Q$ in the series causes the analog switch S1, for the time duration $(T_s - T_A) = T_s/2$, to connect the reference voltage $-V_R$ with the resistor R6 so that magnitude $V_R/R6$ passes through summing point S and resistor R6 discharges the capacitor C1. Simultaneously, the aforesaid negative pulse portion of each voltage pulse $V_Q$ in the series causes the analog switch S2 for time duration $(T_s - T_A) = T_s/2$ to connect the analog voltage signal $-v_{y1}$ with the output terminal z of the multiplier unit 24.

As stated hereinbefore a series of voltage pulse signals $V_Q$ at the output of the operational amplifier A2, or comparator, drives the analog switch S1 which, in turn, switches resistor R6 to $+V_R$ and to $-V_R$, the reference voltages, so as to produce equal current $V_R/R6$ at the summing point S during the positive and negative transition of each voltage pulse signal $V_Q$. Consequently, a $v_x = 0$, the capacitor C1 is charged and discharged by the equal magnitude, but opposite the directed, current $V_R/R6$ so that the average value of the output voltage $V_C = 0$ at the output of operational amplifier A1.

However, when the analog voltage $v_x$ at the terminal $x$ is greater than zero the capacitor C1 is no longer charged and discharged with equal currents. As a result, $V_C$ is no longer equal to zero. Thus, because of the unequal charging and discharging currents and because of the feedback loop (comprising driving voltage $V_Q$, analog switch S1, reference voltages $+V_R$ and $-V_R$, resistor R6 and summing point S) none of the voltage pulse signals $V_Q$ in the series, as indicated at FIG. 11, is symmetrical. As a result the summing point S is no longer maintained at zero potential. Hence, as shown at FIG. 11 (where $v_x$ is greater than zero) each of the voltage pulse signals $V_Q$, which was formerly symmetrical with respect to positive and negative time durations as indicated at FIG. 10, has, in effect, been pulse-width modulated by the amplitude information contained in the sinusoidal waveform of the analog voltage signal $v_x$ (FIG. 9). Since the modulating sinusoidal voltage signal $v_x$ of FIG. 9 has the frequency $f_L$ and the period $T_L = 1/f_L$ and in the pulse-width modulated series of bipolar pulses $V_Q$ of FIG. 11, each bipolar pulse $V_Q$ occurs at the sampling frequency $f_S$, or pulse repetition rate, and has the period $T_S = 1/f_S$ then during the time period $T_L$ there are $k$ sampling pulses $V_Q$ where $$k = f_S/f_L = T_L/T_S \qquad (19)$$

The respective bipolar voltage pulses $V_Q$ in the pulse-width modulated series of FIG. 11 are conveniently designated by the ordinal numbers as the 1st, 2nd and . . . $k$ th pulses $V_Q$. As suggested at FIG. 11, the 1st through $k$ th bipolar pulses $V_Q$ in the series sequentially occupy the whole time period $T_L$ of one full cycle of the sinusoidal signal $v_x$ (FIG. 9). The aforesaid 1st through $k$ th pulses $V_Q$, as suggested at FIG. 11, have positive and negative pulse width portions which vary in the time period $T_L$ in proportion to the amplitude and polarity of the signal voltage $v_x$ of FIG. 9 in the same period $T_L$. Each 1st through $k$ th bipolar pulse-width modulated voltage signal $V_Q$ has a duty cycle (i.e., the ratio $T_A/T_S$) which controls the switching action of the analog switches S1 and S2. In the multiplier unit 24 of FIG. 8, R1 = R6 and the duty cycle $T_A/T_S$ is defined as:

$$T_A/T_S = \tfrac{1}{2}(1 - v_x/V_R) \qquad (20)$$

Accordingly, the positive portions, or segments, of each pulse $V_Q$ cause the analog switch S1 to connect to the reference voltage $+V_R$ to the resistor R6 for the time duration $T_A$, and, also cause the analog voltge switch S2 to connect the sinusoidal analog voltage signal $+v_{y1}$ to the output terminal z for the same time duration $T_A$. Similarly, the negative portions, or segments, of each pulse $V_Q$ cause the analog switch S1 to connect the reference voltage $-V_R$ to the resistor R6 for the time duration $(T_S - T_A)$ and, also, cause the analog switch S2 to connect the sinusoidal analog voltage signal $-v_{y1}$ to the output terminal z for the same duration of time $(T_S - T_A)$. As a result, at the output terminal z of multiplier unit 24 there appears a series of consecutive 1st through $k$ th width-and-amplitude modulated bipolar voltage signals $v_z$. The series of width-and-amplitude modulated signals $v_z$ have the waveforms fore, in the series of signals $v_z$ of FIG. 13 there are 1st through $k$ th consecutive signals $v_z$ occurring during one cycle, or period, $T_L = 1/f_L$ of the analog signal $V_r$ (FIG. 9) as well as one cycle, or period, $T_L = 1/f_L$ of the analog signals $+v_{yl}$ and $-v_{yl}$ (FIG. 12).

If the voltage pulse signal $V_Q$ is comprised of symmetrical pulses ($v_x = 0$) as shown at FIG. 10 the analog switch S2 switches the voltage $+v_{yl}$ and $-v_{yl}$ according to the duty cycle defined by equation 20 to the output terminal $z$ such that the average value of $v_z$ is zero. However, if the pulses $V_Q$ are non-symmetrical ($v_x$ greater than zero) as shown at FIG. 11 the value of the signal $v_z$ becomes larger than zero. Expressed mathematically:

$$v_z = v_{yl}(2 T_A/T_S - 1) \qquad (21)$$

By substituting equation 20 in equation 21 there results:

$$v_z = v_x v_{yl}/V_R \qquad (22)$$

Therefore, the output voltage $v_z$ from multiplier unit 24, at output terminal $z$ thereof, is directly proportional to the product of $v_x$ and $v_{yl}$ where R1 = R6 and $V_R$ is a constant reference voltge.

In equation 22, $v_x$ is an analog voltage representation of the line voltage $v$, defined in equation 1, and $v_{yl}$ is an analog voltage representation of the line current $i$, defined by equation 3. Furthermore, the voltage signal $v_z$ is representative of the instantaneous power $p$ which is variously defined by the equations 5, 7 and 10, hereinbefore set forth.

Each width-and-amplitude modulated bipolar voltage pulse $v_z$ in the series shown in FIG. 13 has positive and negative pulse portions, or segments, of durations $T_A$ and $(T_S - T_A)$ respectively. Also, the positive and negative portions, or segments of each bipolar pulse $v_z$ have substantially symmetrical amplitudes $+v_{yl}$ and $-v_{yl}$. Equation 21, hereinbefore set forth, is derived by setting the product $v_z \cdot T_S$ equal to the difference in the areas of the positive and negative pulse portions; i.e., solving for $v_z$ in the following equation:

$$v_z T_S = v_{yl} T_A - v_{yl}(T_S - T_A) \qquad (21a)$$

As indicated at FIG. 8, from the output terminal $z$ of multiplier unit 24 the series of width and amplitude modulated bipolar voltage pulses $v_z$ (FIG. 13) are delivered at a constant pulse repetition rate $f_s$ (e.g., 10 kilohertz) to an input resistance element R20 of a low-pass filter 26. The resistance element R20 is directly connected to an inverting (−) input terminal of an operational amplifier 07. Another resistance element R22 is connected between a non-inverting (+) input terminal of the amplifier 07 and a reference potential, or ground. A resistance element R21 and capacitor C4 are connected in parallel, as shown, and a parallel combination C4 and R21 are connected between the inverting (−) input terminal and output terminal of operation amplifier 07.

The low-pass filter unit 26 is an active filter using an RC network (R21, C4) to average the series of voltage pulses $v_z$ and deliver at the output of the operational 07 a steady-state voltage signal $V_F$, or d.c. components, of the voltage waveform shown at FIG. 13. As stated hereinbefore each voltage pulse $v_z$ (equation 21, FIG. 13) is representative of the instantaneous power $p$ (equations 4–10, FIG. 4) and if instantaneous power $p$ is averaged over a relatively long time period the result is the average power $P$ (equations 11–12, FIG. 5). In the low-pass filter 26 of FIG. 8 the series of pulses $v_z$ is, in effect, average over a relatively long time period to shown at FIG. 13. As indicated at FIG. 13 each voltage signal $v_z$ has a period $T_S$ and occurs at the constant signal repetition rate $f_S$, or the sampling frequency. Thereprovide a d.c. signal $V_F$ representative of the average power $P$.

The voltage signal $V_F$ is delivered from the output of low-pass filter 26, at the output terminal of operational amplifier 07, to an input terminal $w$ of an analog-to-pulserate converter 28. The function of the converter 28 is to convert the voltage signal $V_F$, representing average power $P$, to a series of quantized pulse signals $V_N$, each representing a constant, or quantized, amount of active electrical energy $W_Q$ (e.g., 1.2 watt-hour) delivered to the electrical load $Z$ in FIG. 8. The converter 28 includes an input resistance element R23 having one end thereof connected to the input terminal $w$ and the other end thereof connected to the summing point $Sw$. As indicated, the summing point $Sw$ is directly connected to an inverting (−) of an operational amplifier 08. Also, another resistance element R24 is connected between a non-inverting (+) input terminal of the operational amplifier 08 and a source of reference potential, or ground. A capacitor C5 is connected between the output terminal of the amplifier 08 and the cumming point $Sw$, which is a point connected in common with the inverting (−) input terminal of operational amplifier 08. The output terminal of operational amplifier 08 is connected through a resistance element R25 with the base of a transistor T1. The transistor T1, as shown at FIG. 8, is an npn transistor having its collector connected to a reference voltage source +V1; the emitter of transistor T1 being connected via a resistance element R26 to a reference potential source, or ground. The emitter of transistor T1 is also connected to the tied-together input terminals of a gate G1. In addition, the emitter of transistor T1 is connected to one input terminal of a flip-flop FF1: the output terminal of the gate G1 being connected to another input terminal of the flip-flop FF1. Another reference voltage source +V3 is connected, as shown, to gate G1. As shown a 6-bit binary divider unit 46 is electrically coupled with the flip-flop FF1 and a crystal oscillator unit 48 is, in turn, electrically coupled with the divider unit 46. The flip-flop FF1 has two outputs. One of the outputs is connected via a resistance element R27 to the base of another npn transistor T2 which has an emitter connected to a source of reference potential, or ground. The other output of the flip-flop FF1 is connected to an input terminal $u$ of a low pulse-rate cut-off circuit 30. As shown the collector of transistor T2 is connected to one end of a resistance element R29 and to the base of another npn transistor T3. Another end of resistance element R29 is connected to the reference voltage source +V1. Also, the collector of transistor T3 is connected to another voltage reference source +VR3. Another resistance element R28 is connected between the emitter of transistor T3 and the summing point $Sw$. The reference voltage sources +V1, +V3 and +VR3 are derived from the power supply 42 as indicated at FIG. 8.

Operationally, the analog to pulse-rate converter 28 converts the input signal voltage $V_F$ to a series of output voltage pulses $V_N$. The series of pulses $V_N$ have a varying pulse repetition rate $f$, or frequency, and the pulse repetition rate $f$ is proportional to average power $P$ (FIG. 5). Moreover, each pulse $V_N$ represents a quantized amount of electrical energy $W_q$. For example, each pulse $V_N$ represents a quantized amount of electrical energy $W_q = 1.2$ watt-hour.

Even though the electric power $P$ delivered to the load $Z$ varies, as shown at FIG. 14, between the maximum and minimum levels, $P_{max}$ and $P_{min}$, over a period of time and the voltage signal $V_F$ delivered at the output of the low-pass filter 26 correspondingly varies between $V_{Fmax}$ and $V_{Fmin}$ during the same period, as shown at FIG. 15, the analog to pulse-rate converter 28 delivers one voltage pulse $V_X$ each time $W_q$ (FIG. 7) reaches a level of 1.2 watt-hour therefore, equation 13b may be written as $$W_q = P_{max} T_{qmin} = P_{min} T_{q\ max} \qquad (13c)$$

Furthermore, if $P_{max}$ is, for example, predetermined such that $P_{max} = 2.078$ Kilowatts and $P_{min}$ is, for example, predetermined such that $P_{min} = 0102598$ kilowatt, then by equation 13c at $P_{max}$, $T_{q\ min} - 2.078$ seconds and at $P_{min}$, $T_{q\ max} = 166.28$ seconds. $T_q$, $T_{q\ max}$ and $T_{q\ min}$ represent the time, in seconds, between output voltages pulses $V_X$ from the flip-flop FF1, or the analog to pulse-rate converter 28. In view of the relativelt long time interval ($T_{q\ max} = 166.28$ seconds) involved, accurate integration of signals representing average power $P$ for the purpose of obtaining another signal representative of electrical energy $W$ would ordinarily require the employment of a prohibitively large integrating capacitor in the integrating section of the analog to pulse-rate converter 28. The use of such a large capacitor is avoided by operating the converter 28 at a much higher pulse rate, or frequency, than 1/66.28 pulses per second and, subsequently, employing a pulse-rate divider circuit 32 to convert the higher operational pulse rate of the converter 28 down to the pulse rate of 1/166.28 pulses per second.

The analog to pulse-rate converter 28 shown at FIG. 8 employs an up-down type integrating circuit. During a time period $T_F$, current $I_F$ charges the capacitor C5 such that $$Q_F(t) = \int_0^{T_F} I_F\, dt \qquad \text{(equation 23)}$$

where $Q_F$ designates the accumulated electrical charge and $I_F$ designates the charging current at the summing point $S_W$. Since the summing point $S_W$ is at virtually zero potential due to the large open loop gain of operational amplifier 08 the current $I_F$ is substantially a function of input voltage $V_F$ and input resistance element R23. When the capacitor C5 is charged to a certain voltage level the flip-flop FF1, which functions as a threshold (delay) flip-flop, is switched for a time interval $T_R$. During the time interval $T_R$ an analog switch, transistor T3, is activated and a current $I_R$ is produced by the discharge of the capacitor C5. The analog switching transistor T3 is activated, or switched, due to the action of a transistor switching control stage comprising transistor T2, resistance element R27 and resistance element R29. As indicated in FIG. 8 the transistor T2 of the aforesaid control stage is activated by flip-flop FF1. The transistor switching control stage (comprising T2, R27, R29 . . . ) functions as a feedback pulse-height reference circuit.

Stated mathematically:

$$Q_R(t) = \int_{T_F}^{(T_F + T_R)} (I_R - I_F)\, dt \qquad \text{(equation 24)}$$

where $Q_R$ represents the electrical charge which is discharged by capacitor C5, $I_R$ represents the electric current produced by the discharge of C5, $I_F$ represents the electric current which charges C5, $T_F$ represents the time interval during which C5 is charged by current $I_F$ and $T_R$ represents the time interval during which C5 is being discharged.

Since $Q_R(t) = Q_F(t)$, then equations 23 and 24 may be set up as an identity; i.e., equal to each other and it follows that $$f = \frac{1}{T_F + T_R} = \frac{1}{I_R T_R} \qquad \text{(equation 25)}$$

where $f$ is the pulse repetition rate, or frequency.

Also, from the circuit relations of the analog to pulse-rate converter 28 (FIG. 8).

$$I_R = \frac{(VR3)}{(R28)} \qquad \text{(equation 26)}$$

$$I_F = \frac{V_F}{(R23)} \qquad \text{(equation 27)}$$

Also, the frequency $f_o$ and period $T_o = 1/f_o$ of crystal oscillator 48 are constants; and, binary divider 46 has a constant division factor $K_o$; e.g., $K_o = 64$.

Therefore, $$T_R = T_o K_o \qquad (28)$$

Consequently, equations 25, 26 and 27 yield $$f = \frac{I_F}{I_R T_R} = \frac{V_F (R28)}{(R23)(VR3) T_o K_o} = \frac{V_F}{K_A} \qquad \text{(equation 29)}$$

In equation 29, $K_A$ is an analog conversion factor in volt seconds. Also, from equation 29

$$K_A = \frac{(R23)}{(R28)}(VR3) T_o K_o \qquad \text{(equation 30)}$$

The output pulse repetition rate $f$ from equation 29, supra, is directly proportional to the input voltage $V_F$ (or, current $I_F$). Also, because $I_R$ and $T_R$ as well as R28 and R23 are constants, an accurate analog voltage-to-frequency conversion is achieved. Moreover, the crystal oscillator 48 operates at 400 kilo-hertz and establishes the time reference interval $T_R$. The 6-bit binary divider unit 46 converts (divides) the frequency $f_o$ of crystal oscillator 48 downwardly by a factor of 64 so that the flip-flop FF1 is driven at a frequency $f_R = 1/T_R = f_o/64 = 6,250$ Hz. Also, the time interval $T_R = 1/f_R$ is the time reference and determines the down integration time of the analog to pulse-rate converter 28. The pulse current $I_R$ is determined by the constant reference voltage VR3 and the constant resistor R28. The current $I_R$ is switched on and off by the analog switching transistor T3 in the down integration loop (comprising the emitter of transistor T3, resistor R28 and the summing point $S_W$) of the analog to pulse-rate converter 28.

At FIGS. 16 and 17 there is shown waveforms at different sections in the analog to pulse-rate converter 28. FIG. 16 illustrates the waveforms of the output voltages developed in the integration section (operational amplifier 08, capacitor C5 . . . ) in the converter 28 in response to the input voltage $V_F$, the waveform of which is illustrated at FIG. 15. Also, FIG. 17 shows the waveforms of a series of output voltage pulses $V_N$ delivered at the output of the analog to pulse-rate converter 28; i.e., at the output of the flip-flop FF1. As indicated at FIG. 17, the series of output pulses $V_N$ as a varying pulse repetition rate $f$, or frequency, corresponding to the amplitude, or level, of the input voltage $V_F$, shown at FIG. 15, each pulse $V_N$ represents a quantized, or constant, energy of 1.2 watt-hour.

From the output of the converter 28 (i.e., the output of flip-flop FF1) the series of quantized pulses $V_N$ is delivered at a pulse repetition rate $f$, proportional to the average power P as represented by $V_F$, to an input terminal $u$ of a low-pulse-rate cut-off circuit 30 as indicated at FIG. 8. As described in detail hereinafter, the cut-off circuit 30 prevents pulses $V_N$ occurring at a repetition rate less than a preselected minimum pulse repetition rate corresponding to the maximum interval $T_q$ $_{max}$ between pulses $V_N$ and corresponding, also, to $P_{min}$, in accordance with equation 13c, from being delivered past input terminal $u$ and the gate G2 of the cut-off circuit 30 to the pulse rate divider circuit 32. Assuming, however, that the series of output pulses $V_N$ are delivered at the output of the converter 28 at a pulse repetition rate f which is within a preselected range of pulse repetition rates which are not cut-off by the action of the cut-off circuit 30, then the pulse-rate divider circuit 32 functions to divide the operating frequency of the analog-to-pulse rate converter 28 to a lower frequency. In FIG. 8 the pulse-rate divider circuit 32 is an eleven bit binary divider. The operating range of the converter 28 is from 12.31 Hz to 985 Hz and the action of the divider circuit 32 converts this range to a new range 0.006 Hz to 0.481 Hz. This conversion, or reduction, corresponds to the time intervals $T_{q\ max}$ = 166.28 seconds and $T_{q\ min}$ = 2.078 seconds. Thus, a division factor $K_D$ = 2048 is applied by the divider circuit 32 to the converter circuit 28. This division, or reduction, provided by the operation of the pulse-rate divider circuit 32 (e.g., an 11 bit binary divider unit) is illustrated at FIG. 18. FIG. 17 shows the series of pulses $V_N$ at the output of the pulserate converter 28, before division by divider circuit 32.

Also, the time interval $T_q$ and the watt-hour constant $W_q$ of the subject metering apparatus are related in accordance with the following:

Equations 14, 16, 17 and 18 may be employed to show that $$T_q = K_C/K_M P \quad (31)$$

and, by setting $$K_C = K_A K_D \quad (32)$$

equation 31 is transformed to appear as $$T_q = K_A K_D/K_M P \quad (33)$$

where, from equation 30, $K_D$ is a function of R23, R28, VR3, $T_o$ and $K_o$, all of which are predetermined constants; $K_D$, from the foregoing description is a constant division factor (e.g., 2048) provided by the binary divider circuit 32; and $K_M$ can be shown to be a function of R6, R1, R2, $V_R$, R21, R20 as well as $K_t$ and $K_i$, hereinafter defined.

$K_t$ is a factor, related to potential transformer 22, and can be shown to be a function of $N_P$, $N_s$, cos γ and $e_v$; $N_p$ and $N_s$ being the number of primary and secondary turns on transformer 22, γ being the phase angle between primary and secondary voltages across windings $N_p$ and $N_s$, and $e_v$ the transformer 22 ratio error.

$K_i$ is a factor, related to current transformer 20, and can be shown to be a function of $N_{ip}$, $N_{is}$, cos β and $e_i$; $N_{ip}$ and $N_{is}$ being the number of primary and secondary turns on transformer 20, β being the phase angle between the primary and secondary current in transformer 20 and $e_i$ being the transformer 20 ratio error.

Therefore, from equation 33, it can be seen that $T_q$ is dependent only on the electrical components chosen and the power P.

As indicated at FIG. 8 the low pulse-rate cut-off circuit 30 is, in effect, a filter circuit. Beginning at the input terminal $u$ a resistance element R30 is connected in series with a transistor D10 which has the base and emitter electrodes connected together. The collector of transistor D10 is connected in series with a capacitor C6, the other end of which is connected to a source of reference potential, or ground. the commonly connected emitter and base of transistor D10 enable the transistor to function as a diode. Another transistor T4 includes a base electrode which is connected to the collector electrode of transistor D10. In addition, the emitter electrode of the npn transistor T4 is connected to a source of reference potential, or ground. The collector of the same transistor T4 is connected via a resistance element R31 to the reference potential source +V1. In addition the collector of transistor T4 is connected to the input of a gate G3; the gate G3 also being connected, to a reference potential source +V2. The reference potential +V2 is derived from the regulated power supply 42. Also, as indicated the gate G3 has two input terminals, both of which are connected together and to the collector electrode of the transistor T4. The output terminal of the gate G3 is connected to an input terminal of another gate G2. The gate G2 also has another input terminal which as indicated is connected to input terminal $u$ of the cut-off circuit 30. In addition, the gate G2 has another input terminal which is connected to a reference potential source +V3. The output terminal of the gate G2 is directly connected, as shown, to the input of the pulse-rate divider circuit 32, or 11-bit binary divider unit. Operationally no pulses $V_N$ are to be delivered to the pulse-rate divider circuit 32 if the average power P is below $P_{min}$ (FIG. 14) or, correspondingly, if the voltage $V_F$ is below $V_{F\ min}$ (FIG. 15). However, pulses $V_N$ can pass to the divider circuit 32 in the event that the gate G3 output is at logical "1," or if the collector of the transistor T4 is approximately 0 volts. Such is the case when a predetermined voltage level is reached by the charging capacitor C6. The aforesaid voltage level, when reached, activates transistor T4. The cut-off frequency, or pulse repetition rate, may be adjusted to a preselected value by varying R30 or C6.

If the pulse repetition rate is below a preselected minimum, the voltage across capacitor C6 is too small to activate transistor T4 so that the input at gate G3 is a logical "1" and, therefore, the output of the gate G3 is at logical "0." As a consequence, none of the voltage pulses $V_N$ arriving at input terminal u can pass through the gate G2.

The series of pulses $V_N$, representative of quantized, or constant, amounts of electrical energy $W_q$ delivered at the output of the gate G2 are processed in the pulse rate divider circuit 32 and the divided-rate output pulses $V_N$ delivered at the output of the divider circuit 32 are amplified in the pulse amplifier unit 34. The divided-rate output pulses $V_N$ emanating from the divider circuit 32 are shown at FIG. 18. The pulse amplifier unit 34 produces a series of amplified output pulses for driving the stepping motor 36 which, in turn, drives the display register 38 and, in effect, accumulates the output pulses. The accumulated or counted output pulses represent electrical energy $W$.

Also shown at FIGS. 1 and 8 dotted line in a data transfer switch unit 40. The transfer unit 40 is indicated in dotted line because it is an optional unit. It may be included in the metering system as a desirable additional functional unit if circumstances so require it. As indicated at FIGS. 1 and 8 the input terminal of the data transfer switch unit 40 may be coupled either to the output of the cut-off circuit 30, or, in the alternative, to the output of the divider circuit 32 depending on whether it is desired to transmit data pulses $V_N$ at the higher pulse repetition rate from the output terminal of the gate G2 of the cut-off circuit 30 or at the divided pulse repetition rate at the output of the divider circuit 32. For telemetering operations it is often desirable to transmit pulses at the higher pulse repetition rate, or frequency. Operationally the data transfer switch unit 40 may be activated by a signal or signals from a remote metering location by applying such signal, or signals, to the transmission line 40a. As indicated the transmission line 40a is coupled between the remote metering location and a terminal or terminals at an end of the data transfer switch unit 40. When activating signals applied to the transmission line 40a activate the data transfer switch unit 40 the series of output voltage pulses $V_N$ are, in effect, transferred through the switch unit 40 and along the transmission line 40a to the remote metering location. The transferred pulses $V_N$, as stated hereinbefore, may be taken from the output of the cut-off circuit 30 or from the output of the pulse-rate divider circuit 32.

Also the pulse-rate divider circuit 32 (e.g., 11-bit binary divider unit) may be a non-volatile type of unit so as to provide buffer storage capability in the event of a power failure so that information therein may be safely stored during the period of the failure and processed after power has been restored. The metering apparatus shown at FIGS. 1 and 8 is also adaptable for performing totalizing operations. For example, other single-phase systems having their own multiplier units and associated current and potential transformers may be coupled with the metering system shown in FIGS. 1 and 8 by connecting the output of the aforesaid additional multipliers of the other single phase systems to the terminal z which is the input to the low-pass filter 26. In such case the filter 26, pulse-rate converter 28, cut-off circuit 30, divider circuit 32, pulse amplifier unit 34, stepping motor 36 and the display register 38 would be common to all of the single phase systems and the electrical energy at all of these systems would, therefore, be totalized and displayed by the register 38.

Although, in computing the mathematical product $p = vi$ (equation 4) the analog signal $v_r$, representative of $v$, is described, hereinbefore with reference to the multiplier unit 24 at FIG. 8, as being employed for the purpose of converting the bipolar signals $V_Q$ to pulse-width modulated bipolar pulses, as shown at FIG. 11, and that the analog signals $+v_{u1}$ and $-v_{u1}$, representative of $i$, are gated, or switched, by the analog switch S2 to provide a pulse-width-amplitude modulated signal $v_z$ representative of $p$, it is to be understood that the mathematical product $p = vi$ can also be obtained by employing the analog signal $+v_{u1}$ instead of the analog signal $v_r$, to convert the bipolar signals $V_Q$ to pulse-width modulated bipolar pulses like those shown at FIG. 11 and that the analog signal $v_r$ (and a 180° phase inverted signal $-v_r$) can be used to switch, or gate, the analog switch S2 to provide a pulse-width-amplitude modulated signal like the signal $v_z$ which is representative of instantaneous power $p$.

The various operational amplifiers shown at FIG. 8 may be type SSS741B manufactured by Precision Monolithics Incorporated, Santa Clara, Cal.

Although the foregoing description and accompanying drawing figures set forth a method of practicing the invention, as well as metering apparatus embodying the invention, it is to be understood that said description and drawing figures are purposeful for providing examples of the invention. Many changes may be made respecting the steps, and combination of steps, of disclosed method. Similarly, many changes may be made respecting the elements, and combination of elements, of the disclosed metering apparatus. Such changes may involve, inter alia, substitutions, modifications, rearrangements, etc., of steps and elements. Nevertheless, such changes may be made without departing from the spirit of the invention, or from the scope of the claims hereinafter set forth.

I claim:

1. A method for metering electrical energy in an a.c., single phase, two line, $f_L$ hertz system comprising:

producing a first analog signal of $f_L$ hertz representative of electrical current flowing in said system, producing a second analog signal of $f_L$ hertz representative of electrical voltage in said system, multiplying said first and second analog signal to produce a third analog signal representative of electrical power in said system, converting said third analog signal to a series of quantized signals, the signal repetition rate of said series of quantized signals being proportional to said power and each quantized signal representing a constant predetermined unit of energy in said system, rejecting those quantized signals which occur at a repetition rate below a preselected repetition rate, and counting only the non-rejected quantized signals which occur at a repetition rate above said preselected repetition rate thereby accurately metering said electrical energy.

2. Apparatus for metering electrical energy in an a.c. single phase, two line, $f_L$ hertz system comprising:

first transducer means for producing a first analog signal of $f_L$ hertz representative of electrical current flowing in said system, second transducer means for producing a second analog signal of $f_L$ hertz representative of electrical voltage in said system, multiplying means operatively connected to said first and second transducer means for receiving said first and second analog signals, for multiplying said first and second analog signals and thereby producing a third analog signal representative of electrical power in said system, analog-to-digital conversion means operatively connected to said multiplying means for converting said third analog signal to a series of quantized signals, the signal repetition rate of said series of quantized signals being proportional to said power and each quantized signal representing a constant predetermined unit of energy in said system, low pulse rate cut-off circuit means operatively connected to said analog-to-digital conversion means for passing only those quantized signals which occur at a repetition rate above a preselected repetition rate, and counting means connected to said low pulse rate cut-off circuit means for counting the quantized signals passed thereby and thus accurately metering said electrical energy.

3. A method for metering electrical energy in an a.c., single phase, two line, $f_L$ hertz system comprising: producing a first analog signal of $f_L$ hertz representative of current in one of the two lines; producing a second analog signal of $f_L$ hertz representative of voltage between the two lines; producing a third analog signal which is 180° out of phase relative to said first analog signal and otherwise like said analog signal; producing a first series of bipolar pulse signals, said first series of signals having a signal repetition rate $f_S$ which is greater than $f_L$, each bipolar pulse signal of said first series having positive and negative pulse signal portions of equal amplitudes and time durations; pulse width modulating said first series of bipolar pulse signals with said second analog signal so as to produce a second series of pulse-width-modulated bipolar pulse signals, said second series of signals having the signal repetition rate $f_S$, each bipolar pulse signal of said second series having the period $T_S = 1/f_S$ and a positive pulse signal portion of time duration $T_A$ so that for each bipolar pulse signal of said second series the ratio $T_A/Y_S$ is proportional to the amplitude of said modulating second analog signal at a time corresponding to the occurrence of the particular pulse signal in said second series; gating said first analog signal under the control of said second series of pulse signals for the time durations $T_A$ of each positive pulse signal portion of each pulse signal in said second series and als gating said third analog signal under the control of said second series of pulse signals for the time durations $(I_S-T_A)$ of each negative pulse signal portion of each pulse signal in said second series so as to produce from said gated first and third analog signals a third series of bipolar pulse signals, said third series of signals having the signal repetition rate $f_S$, each said bipolar pulse signal of said third series including a unipolar component signal of duration $T_S$, which is the period of each said bipolar pulse signal, said unipolar component signal having an amplitude proportional to the difference between the areas of the positive and negative pulse signal portions of the bipolar pulse signal; filtering said third series of bipolar pulse signals and producing a first unipolar signal having, during a time duration at least as long as $1/f_L$, an amplitude proportional to the average of the amplitudes of said unipolar component signals of said third series of signals; converting said first unipolar signal to a series of quantized signals, the signal repetition rate of said series of quantized signals being proportional to the amplitude of said first unipolar signal, each quantized signal representing a constant, said constant being proportional to the time integral of Pdt over a duration of time $T_q$, P representing the amplitude of said first unipolar signal; counting said quantized signals; and rejecting those quantized signals which occur at a rate below a preselected repetition rate so that only quantized signals occurring at or above said preselected rate are counted.

4. A method for metering electrical energy in an a.c., single phase, two line, $f_L$ hertz system comprising: producing a first analog signal of $f_L$ hertz representative of current in one of the two lines; producing a second analog signal of $f_L$ hertz representative of voltage between the two lines; producing a third analog signal which is 180° out of phase relative to said first analog signal and otherwise like said first analog signal; producing a first series of bipolar pulse signals, said first series of signals having a signal repetition rate $f_S$ which is greater than $f_L$, each bipolar pulse signal of said first series having positive and negative pulse signal portions of equal amplitudes and time durations; pulse width modulating said first series of bipolar pulse signals with said second analog signal so as to produce a second series of pulse-width-modulated bipolar pulse signals, said second series of signals having the signal repetition rate $f_S$, each bipolar pulse signal of said second series having the period $T_S = 1/f_S$ and a positive pulse signal portion of time duration $T_A$ so that for each bipolar pulse signal of said second series the ratio $T_A/T_S$ is proportional to the amplitude of said modulating second analog signal at a time corresponding to the occurrence of the particular pulse signal in said second series; gating said first analog signal under the control of said second series of pulse signals for the time durations $T_A$ of each positive pulse signal portion of each pulse signal in said second series and also gating said third analog signal under the control of said second series of pulse signals for the time durations $(T_S-T_A)$ of each negative pulse signal portion of each said pulse signal in said second series so as to produce from said gated first and third analog signals a third series of bipolar pulse signals, said third series of signals having the signal repetition rate $f_S$, each said bipolar pulse signal of said third series including a unipolar component signal of duration $T_S$, which is the period of each said bipolar pulse signal, said unipolar component signal having an amplitude proportional to the difference between the areas of the positive and negative pulse signal portions of the bipolar pulse signal; filtering said third series of bipolar pulse signals and producing a first unipolar signal having, during a time duration at least as long as $1/f_L$, an amplitude proportional to the average of the amplitudes of said unipolar component signals of said third series of signals; converting said first unipolar signal to a series of quantized signals, the signal repetition rate of said series of quantized signals being proportional to the amplitude of said first unipolar signal, each quantized signal representing a constant, said constant being proportional to the time integral of Pdt over a duration of time $T_q$, P representing the amplitude of said first unipolar signal; dividing the signal repetition rate of said series of quantized signals so as to produce another series of quantized signals having a smaller signal repetition rate which is also proportional to the amplitude of said first unipolar signal, each quantized signal of the series of divided-rate signals representing a constant, said constant being proportional to the time integral of Pdt over a duration of time $T_q$, P representing the amplitude of said first unipolar signal; counting said divided-rate quantized signals; and rejecting those quantized signals which occur at a rate below a preselected repetition rate so that only the quantized signals occurring at or above said preselected rate have their signal repetition rate divided so as to produce said other series of quantized signals at said smaller signal repetition rate.

5. A method of metering electrical energy in an a.c., single phase, two line, $f_L$ hertz system comprising: producing a first analog signal of $f_L$ hertz representative of current in one of the two lines; producing a second analog signal of $f_L$ hertz representative of voltage between the two lines; producing a third analog signal which is 180° out of phase relative to said second analog signal and otherwise like said second analog signal; producing a first series of bipolar pulse signals, said first series of signals having a signal repetition rate $f_S$ which is greater than $f_L$, each bipolar pulse signal of said first series having positive and negative pulse signal portions of equal amplitudes and time durations; pulse width modulating said first series of bipolar pulse signals with said first analog signal so as to produce a second series of pulse-width-modulated bipolar pulse signals, said second series of signals having the signal repetition rate $f_S$, each bipolar pulse signal of said second series having the period $T_S = 1/f_S$ and a positive pulse signal portion of time duration $T_A$ so that for each bipolar pulse signal of said second series the ratio $T_A/T_S$ is proportional to the amplitude of said modulating first analog signal at a time corresponding to the occurrence of the particular pulse signal in said second series; gating said second analog signal under the control of said second series of pulse signals for the time durations $T_A$ of each positive pulse signal portion of each pulse signal in said second series and also gating said third analog signal under the control of said second series of pulse signals for the time durations $(T_S - T_A)$ of each negative pulse signal portion of each said pulse signal in said second series so as to produce from said gating second and third analog signals a third series of bipolar pulse signals, said third series of signals having the signal repetition rate $f_S$, each said bipolar pulse signal of said third series including a unipolar component signal of duration $I_S$, which is the period of each said bipolar pulse signal, said unipolar component signal having an amplitude proportional to the difference between the areas of the positive and negative pulse signal portions of the bipolar pulse signal; filtering said third series of bipolar pulse signals and producing a first unipolar signal having, during a time duration at least as long as $1/f_L$, an amplitude proportional to the average of the amplitudes of said unipolar component signals of said third series of signals; converting said first unipolar signal to a series of quantized signals, the signal repetition rate of said series of quantized signals being proportional to the amplitude of said first unipolar signal, each quantized signal representing a constant, said constant being proportional to the time integral of Pdt over a duration of time $T_q$, P representing the amplitude of said first unipolar signal; counting said quantized signals; and rejecting those quantized signals which occur at a rate below a preselected repetition rate so that only quantized signals occurring at or above said preselected rate are counted.

6. A method of metering electrical energy in an a.c., single phase, two line, $f_L$ hertz system comprising: producing a first analog signal of $f_L$ hertz representative of current in one of the two lines; producing a second analog signal of $f_L$ hertz representative of voltage between the two lines; producing a third analog signal which is 180° out of phase relative to said second analog signal and otherwise like said second analog signal; producing a first series of bipolar pulse signals, said first series of signals having a signal repetition rate $f_S$ which is greater than $f_L$, each bipolar pulse signal of said first series having positive and negative pulse signal portions of equal amplitudes and time durations; pulse width modulating said first series of bipolar pulse signals with said first analog signal so as to produce a second series of pulse-width-modulated bipolar pulse signals, said second series of signals having the signal repetition rate $f_S$, each bipolar pulse signal of said second series having the period $T_S = 1/f_S$ and a positive pulse signal portion of time duration $T_A$ so that for each bipolar pulse signal of said second series the ratio $T_A/T_S$ is proportional to the amplitude of said modulating first analog signal at a time corresponding to the occurrence of the particular pulse signal in said second series; gating said second analog signal under the control of said second series of pulse signals for the time durations $T_A$ of each positive pulse signal portion of each pulse signal in said second series and also gating said third analog signal under the control of said second series of pulse signals for the time durations $(T_S - T_A)$ of each negative pulse signal portion of each said pulse signal in said second series so as to produce from said gating second and third analog signals a third series of bipolar pulse signals, said third series of signals having the signal repetition rate $f_S$, each said bipolar pulse signal of said third series including a unipolar component signal of duration $T_S$, which is the period of each said bipolar pulse signal, said unipolar component signal having an amplitude proportional to the difference between the areas of the positive and negative pulse signal portions of the bipolar pulse signal; filtering said third series of bipolar pulse signals and producing a first unipolar signal having, during a time duration at least as long as $1/f_L$, an amplitude proportional to the average of the amplitudes of said unipolar component signals of said third series of signals; converting said first unipolar signal to a series of quantized signals, the signal repetition rate of said series of quantized signals being proportional to the amplitude of said first unipolar signal, each quantized signal representing a constant, said constant being proportional to the time integral of Pdt over a duration of time $T_q$, P representing the amplitude of said first unipolar signal; dividing the signal repetition rate of said series of quantized signals so as to produce another series of quantized signals having a smaller signal repetition rate which is also proportional to the amplitude of said first unipolar signal, each quantized signal of the series of divided-rate signals representing a constant, said constant being proportional to the time integral of Pdt over a duration of time $T_q$, P representing the amplitude of said first unipolar signal; counting said divided-rate quantized signals; and rejecting those quantized signals which occur at a rate below a preselected repetition rate so that only the quantized signals occurring at or above said preselected rate have their signal repetition rate divided so as to produce said other series of quantized signals at said smaller signal repetition rate.

7. Apparatus for metering electrical energy in an a.c., single phase, two line, $f_L$ hertz system comprising: means for producing a first analog signal of $f_L$ hertz representative of current in one of the two lines; means for producing a second analog signal of $f_L$ hertz representative of voltage between the two lines; means for producing a third analog signal which is 180° out of phase relative to said first analog signal and otherwise like said first analog signal; means for producing a first series of bipolar pulse signals, said first series of signals having a signal repetition rate $f_S$ which is greater than $f_L$, each bipolar pulse signal of said first series having positive and negative pulse signal portions of equal amplitudes and time durations; means for pulse-width modulating said first series of bipolar pulse signals with said second analog signal so as to produce a second series of pulse-width modulated bipolar pulse signals, said second series of signals having the signal repetition rate $f_S$, each bipolar pulse signal of said second series having the period $T_S = 1/f_S$ and a positive pulse signal portion of time duration $T_A$ so that for each bipolar pulse signal of said second series the ratio $T_A/T_S$ is proportional to the amplitude of said modulating second analog signal at a time corresponding to the occurrence of the particular pulse signal in said second series; means for gating said first analog signal under the control of said second series of pulse signals for the time durations $T_A$ of each positive pulse signal portion of each said pulse signal in said second series and also gating said third analog signal under the control of said second series of pulse signals for the time durations $(T_S/T_A)$ of each negative pulse signal portion of each said pulse signal in said second series so as to produce from said gating first and third analog signals a third series of bipolar pulse signals, said third series of signals having the signal repetition rate $f_S$, each said bipolar pulse signal of said third series including a unipolar component signal of duration $T_S$, which is the period of each said bipolar pulse signal, said unipolar component signal having an amplitude proportional to the difference between the areas of the positive and negative pulse signal portions of the bipolar pulse signal; means for filtering said third series of bipolar pulse signals and producing a first unipolar signal having, during a time duration at least as long as $1/f_L$, an amplitude proportional to the average of the amplitudes of said unipolar component signals of said third series of signals; means for converting said first unipolar signal to a series of quantized signals, the signal repetition rate of said series of quantized signals being proportional to the amplitude of said first unipolar signal, each quantized signal representing a constant, said constant being proportional to the time integral of Pdt over a duration of time $T_q$, P representing the amplitude of said first unipolar signal; means for counting said quantized signals; and means for rejecting those quantized signals which occur at a rate below a preselected repetition rate so that only quantized signals occurring at or above said preselected rate are counted.

8. Apparatus for metering electrical energy in an a.c., single phase, two line, $f_L$ hertz system comprising: means for producing a first analog signal of $f_L$ hertz representative of current in one of the two lines; means for producing a second analog signal of $f_L$ hertz representative of voltage between the two lines; means for producing a third analog signal which is 180° out of phase relative to said first analog signal and otherwise like said first analog signal; means for producing a first series of bipolar pulse signals, said first series of signals having s signal repetition rate $f_S$ which is greater than $f_L$, each bipolar pulse signal of said first series having positive and negative pulse signal portions of equal amplitudes and time durations; means for pulse-width modulating said first series of bipolar pulse signals with said second analog signal so as to produce a second series of pulse-width modulated bipolar pulse signals, said second series of signals having the signal repetition rate $f_S$, each bipolar pulse signal of said second series having the period $T_S = 1/f_S$ and a positive pulse signal portion of time duration $T_A$ so that for each bipolar pulse signal of said second series the ratio $T_A/T_S$ is proportional to the amplitude of said modulating second analog signal at a time corresponding to the occurrence of the particular pulse signal in said second series; means for gating said first analog signal under the control of said second series of pulse signals for the time durations $T_A$ of each positive pulse signal portion of each said pulse signal in said second series and also gating said third analog signal under the control of said second series of pulse signals for the time durations $(T_S/T_A)$ of each negative pulse signal portion of each said pulse signal in said second series so as to produce from said gating first and third analog signals a third series of bipolar pulse signals, said third series of signals having the signal repetition rate $f_S$, each said bipolar pulse signal of said third series including a unipolar component signal of duration $T_S$, which is the period of each said bipolar pulse signal, said unipolar component signal having an amplitude proportional to the difference between the areas of the positive and negative pulse signal portions of the bipolar pulse signal; means for filtering said third series of bipolar pulse signals and producing a first unipolar signal having, during a time duration at least as long as $1/f_L$, an amplitude proportional to the average of the amplitudes of said unipolar component signals of said third series of signals; means for converting said first unipolar signal to a series of quantized signals, the signal repetition rate of said series of quantized signals being proportional to the amplitude of said first unipolar signal, each quantized signal representing a constant, said constant being proportional to the time integral of Pdt over a duration of time $T_q$, P representing the amplitude of said first unipolar signal; means for dividing the signal repetition rate of said series of quantized signals so as to produce another series of quantized signals having a smaller signal repetition rate which is also proportional to the amplitude of said first unipolar signal, each quantized signal of the series of divided rate signals representing a constant, said constant being proportional to the time integral Pdt over a duration of time $T_q$, P representing the amplitude of said first unipolar signal; means for counting said divided-rate quantized signals; and means for rejecting those quantized signals which occur at a rate below a preselected repetition rate so that only the quantized signals occurring at or above said preselected rate have their signal repetition rate divided so as to produce said other series of quantized signals at said smaller signal repetition rate.

9. Apparatus for metering electrical energy in an a.c., single phase, two line, $f_L$ hertz system comprising: means for producing a first analog signal of $f_L$ hertz representative of current in one of the two lines; means for producing a second analog signal of $f_L$ hertz representative of voltage between the two lines; means for producing a third analog signal which is 180° out of phase relative to said second analog signal and otherwise like said second analog signal; means for producing a first series of bipolar pulse signals, said first series of signals having a signal repetition rate $f_S$ which is greater than $f_L$, each bipolar pulse signal of said first series having positive and negative pulse signal portions of equal amplitudes and time durations; means for pulse-width modulating said first series of bipolar pulse signals with said first analog signal so as to produce a second series of pulse-width modulated bipolar pulse signals, said second series of signals having the signal repetition rate $f_S$, each bipolar pulse signal of said second series having the period $T_S = 1/f_S$ and a positive pulse signal portion of time duration $T_A$ so that for each bipolar pulse signal of said second series of ratio $T_A/T_S$ is proportional to the amplitude of said modulating first analog signal at a time corresponding to the occurrence of the particular pulse signal in said second series; means for gating said second analog signal under the control of said second series of pulse signals for the time durations $T_A$ of each positive pulse signal portion of each said pulse signal in said second series and also gating said third analog signal under the control of said second series of pulse signals for the time durations $(T_S - T_A)$ of each negative pulse signal portion of each said pulse signal in said second series so as to produce from said gated second and third analog signals a third series of bipolar pulse signals, said third series of signals having the signal repetition rate $f_S$, each said bipolar pulse signal of said third series including a unipolar component signal of duration $T_S$, which is the period of each said bipolar pulse signal, said unipolar component signal having an amplitude proportional to the difference between the areas of the positive and negative pulse signal portions of the bipolar pulse signal; means for filtering said third series of bipolar pulse signals and producing a first unipolar signal having, during a time duration at least as long as $1/f_L$, an amplitude proportional to the average of the amplitudes of said unipolar component signals of said third series of signals; means for converting said first unipolar signal to a series of quantized signals, the signal repetition rate of said series of quantized signals being proportional to the amplitude of said first unipolar signal, each quantized signal representing a constant, said constant being proportional to the time integral of $Pdt$ over a duration of time $T_q$, $P$ representing the amplitude of said first unipolar signal; means for counting said quantized signals; and means for rejecting those quantized signals which occur at a rate below a preselected repetition rate so that only quantized signals occurring at or above said preselected rate are counted.

10. Apparatus for metering electrical energy in an a.c., single phase, two line, $f_L$ hertz system comprising: means for producing a first analog signal of $f_L$ hertz representative of current in one of the two lines; means for producing a second analog signal of $f_L$ hertz representative of voltage between the two lines; means for producing a third analog signal which is 180° out of phase relative to said second analog signal and otherwise like said second analog signal; means for producing a first series of bipolar pulse signals, said first series of signals having a signal repetition rate $f_S$ which is greater than $f_L$, each bipolar pulse signal of said first series having positive and negative pulse signal portions of equal amplitudes and time durations; means for pulse-width modulating said first series of bipolar pulse signals with said first analog signal so as to produce a second series of pulse-width modulated bipolar pulse signals, said second series of signals having the signal repetition rate $f_S$, each bipolar pulse signal of said second series having the period $T_S = 1/f_S$ and a positive pulse signal portion of time duration $T_A$ so that for each bipolar pulse signal of said second series the ratio $T_A/T_S$ is proportional to the amplitude of said modulating first analog signal at a time corresponding to the occurrence of the particular pulse signal in said second series; means for gating said second analog signal under the control of said second series of pulse signals for the time durations $T_A$ of each positive pulse signal portion of each said pulse signal in said second series and also gating said third analog signal under the control of said second series of pulse signals for the time durations $(T_S - T_A)$ of each negative pulse signal portion of each said pulse signal in said second series so as to produce from said gated second and third analog signals a third series of bipolar pulse signals, said third series of signals having the signal repetition rate $f_S$, each said bipolar pulse signal of said third series including a unipolar component signal of duration $T_S$, which is the period of each said bipolar pulse signal, said unipolar component signal having an amplitude proportional to the difference between the areas of the positive and negative pulse signal portions of the bipolar pulse signal; means for filtering said third series of bipolar pulse signals and producing a first unipolar signal having, during a time duration at least as long as $1/f_L$, an amplitude proportional to the average of the amplitudes of said unipolar component signals of said third series of signals; means for converting said first unipolar signal to a series of quantized signals, the signal repetition rate of said series of quantized signals being proportional to the amplitude of said first unipolar signal, each quantized signal representing a constant, said constant being proportional to the time integral of $Pdt$ over a duration of time $T_q$, $P$ representing the amplitude of said first unipolar signal; means for dividing the signal repetition rate of said series of quantized signals so as to produce another series of quantized signals having a smaller signal repetition rate which is also proportional to the amplitude of said first unipolar signal, each quantized signal of the series of divided rate signals representing a constant, said constant being proportional to the time integral $Pdt$ over a duration of time $T_q$, $P$ representing the amplitude of said first unipolar signal; means for counting said divided-rate quantized signals; and means for rejecting those quantized signals which occur at a rate below a preselected repetition rate so that only the quantized signals occurring at or above said preselected rate have their signal repetition rate divided so as to produce said other series of quantized signals at said smaller signal repetition rate.

* * * * *